US011457782B2

(12) United States Patent
Sun et al.

(10) Patent No.: US 11,457,782 B2
(45) Date of Patent: Oct. 4, 2022

(54) ROBOT CLEANER

(71) Applicant: LG Electronics Inc., Seoul (KR)

(72) Inventors: Changhwa Sun, Seoul (KR); Sangjo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 217 days.

(21) Appl. No.: 16/259,316

(22) Filed: Jan. 28, 2019

(65) Prior Publication Data

US 2019/0231156 A1 Aug. 1, 2019

(30) Foreign Application Priority Data

Jan. 29, 2018 (KR) .................. 10-2018-0010942

(51) Int. Cl.
*A47L 9/04* (2006.01)
*A47L 9/00* (2006.01)
*B25J 11/00* (2006.01)
*A47L 11/40* (2006.01)
*A47L 9/02* (2006.01)

(52) U.S. Cl.
CPC ............ *A47L 9/0477* (2013.01); *A47L 9/009* (2013.01); *A47L 9/02* (2013.01); *A47L 11/4011* (2013.01); *B25J 11/0085* (2013.01); *A47L 2201/00* (2013.01)

(58) Field of Classification Search
CPC .. A47L 11/4011; A47L 2201/00; A47L 9/009; A47L 9/02; A47L 9/0477; A47L 9/2852; A47L 9/0633; A47L 9/064; A47L 9/0653; A47L 9/066; A47L 9/0666; B25J 11/0085

USPC ............ 142/10; 15/368, 373, 418; 57/58.49; 74/471 R
See application file for complete search history.

(56) References Cited

U.S. PATENT DOCUMENTS

| 2,511,238 | A |   | 6/1950  | Beede |
|-----------|---|---|---------|-------|
| 4,499,628 | A | * | 2/1985  | Platt .................... A47L 9/02 15/416 |
| 5,819,366 | A |   | 10/1998 | Edin |
| 7,222,393 | B2 |  | 5/2007  | Kaffenberger et al. |
| 7,631,395 | B2 |  | 12/2009 | Oh |
| 9,044,128 | B1 |  | 6/2015  | Thomas |

(Continued)

FOREIGN PATENT DOCUMENTS

CA    2625754 A1   12/2008
CN  101313830 A    12/2008

(Continued)

OTHER PUBLICATIONS

Translation of JP2002000512A description (Year: 2022).*

(Continued)

*Primary Examiner* — Monica S Carter
*Assistant Examiner* — Sarah Akyaa Fordjour
(74) *Attorney, Agent, or Firm* — Birch, Stewart, Kolasch & Birch, LLP

(57) ABSTRACT

A robot cleaner includes a body configured to house a suction motor, a nozzle coupled to the body and including a suction port, and a movable unit coupled to the nozzle in front of the suction port. The movable unit is movable between a first position where the movable unit overlaps with the nozzle and a second position where the movable unit protrudes forward from the nozzle.

11 Claims, 22 Drawing Sheets

(56) References Cited

U.S. PATENT DOCUMENTS

| | | | |
|---|---|---|---|
| 9,414,734 B2* | 8/2016 | Moon | A47L 11/4011 |
| 9,788,696 B2 | 10/2017 | Guinot et al. | |
| 9,962,051 B2 | 5/2018 | Kasper | |
| 10,264,938 B2* | 4/2019 | Ichikawa | A47L 9/2852 |
| 2008/0295270 A1 | 12/2008 | Lee | |
| 2015/0245754 A1 | 9/2015 | Jang et al. | |
| 2017/0188767 A1* | 7/2017 | Ichikawa | A47L 9/2884 |
| 2017/0332853 A1 | 11/2017 | Nam | |
| 2018/0103812 A1* | 4/2018 | Lee | A47L 9/0653 |

FOREIGN PATENT DOCUMENTS

| | | | |
|---|---|---|---|
| CN | 103826517 A | | 5/2014 |
| CN | 204207675 U | | 3/2015 |
| DE | 29803415 U1 | | 8/1998 |
| EP | 0780084 A2 | | 6/1997 |
| JP | 01-181826 | | 7/1989 |
| JP | H01-181826 A | | 7/1989 |
| JP | 07023882 | | 1/1995 |
| JP | H10-179460 A | | 7/1998 |
| JP | 11-239551 A | | 9/1999 |
| JP | 2002000512 A | * | 1/2002 |
| JP | 4612156 | | 10/2010 |
| KR | 10-0835968 | | 6/2008 |
| KR | 10-2015-0102365 | | 9/2015 |

OTHER PUBLICATIONS

International Search Report dated May 1, 2019.
Communication from European Patent Office on Application No. 19743665.2 dated Sep. 24, 2021.

* cited by examiner

ROBOT CLEANER

CROSS-REFERENCE TO RELATED APPLICATIONS

This application claims priority to Korean Patent Application No. 10-2018-0010942 filed on Jan. 29, 2018 in Korea, the entire contents of which is hereby incorporated by reference in its entirety.

BACKGROUND

The present disclosure relates to a robot cleaner.

In general, a robot cleaner is a household appliance that suctions and removes foreign matters on the floor. Among such cleaners, a cleaner that automatically cleans up a house is referred to as a robot cleaner.

The robot cleaner suctions and removes foreign matters on the floor while moving by the driving force of a motor that operates by receiving power from a battery.

A prior art, which is U.S. Pat. No. 7,222,393B2, discloses a robot cleaner nozzle.

A robot cleaner nozzle disclosed in the prior art includes an upper part and a plastic slide bottom having a suction port. A gasket base is provided in the upper part, and includes a gasket element having a strip shape. The gasket base may be rotated around a rotational axis by a tilting lever handled by a user.

The gasket element having the stripe shape may be positioned inside the nozzle or protruding out of the nozzle depending on the rotation of the gasket base.

According to the prior art, the gasket element protrudes out of the nozzle only when the user handles the tilting lever, which annoys a user.

In addition, although the tilting lever has to protrude out of the nozzle such that the user handles the tilting lever, the tilting lever is positioned in back of the nozzle, and the gasket element is positioned in front of the nozzle. Accordingly, a transmitting structure of transmitting the rotational force of the tilting lever to the gasket element is required. Therefore, the transmission structure becomes complicated, and the volume of the nozzle becomes increased due to the transmission structure.

SUMMARY

The embodiment provides a robot cleaner having a movable unit, which is positioned to protrude forward out of an inclined surface of a nozzle, to clean a corner.

The embodiment provides a robot cleaner having a movable unit overlapping with an inclined surface of a nozzle to easily cross over an obstacle.

The embodiment provides a robot cleaner in which the position of a movable unit is changeable without the handling of a user or additional power source.

According to an aspect of the present invention, a robot cleaner includes a body including a suction motor, a nozzle coupled to the body and including a suction port, and a movable unit coupled to the nozzle in front of the suction port and being movable between a first position where the movable unit overlaps with the nozzle and a second position where the movable unit protrudes forward from the nozzle. The movable unit may be arranged such that a front surface of the movable unit is inclined with respect to a vertical line in a state that the movable unit is moved to the first position.

According to another aspect of the present disclosure, the robot cleaner may include a body including a suction motor, a nozzle coupled to the body and including a suction port, a bumper provided in the nozzle, and a movable unit coupled to the nozzle in back of a front surface of the bumper, and connected with the bumper to receive moving force of the bumper.

The movable unit may be positioned at a first position where the movable unit overlaps with the nozzle in a state that external force is not applied to the bumper, and may receive the moving force of the bumper to move from the position to a second position where the movable unit protrudes to a front portion of the nozzle, when the external force is applied to the bumper.

The front surface of the movable unit may be positioned in back of the front surface of the bumper in a state that the movable unit is moved to the second position.

According to another aspect of the present disclosure, a robot cleaner may include a body including a suction motor, a nozzle connected with the body and including a suction port, and a movable unit coupled to the nozzle. The movable unit may be moved to a second position where the movable unit protrudes to a front portion of the nozzle, in a state that external force is not applied to the movable unit, and may be moved from the second position to a first position where the movable unit overlaps with the nozzle, when the external force is applied to the movable unit.

The robot cleaner may further include an elastic member to elastically support the movable unit such that the movable unit is moved from the first position to the second position.

DETAILED DESCRIPTION OF THE EMBODIMENTS

Figure 1:
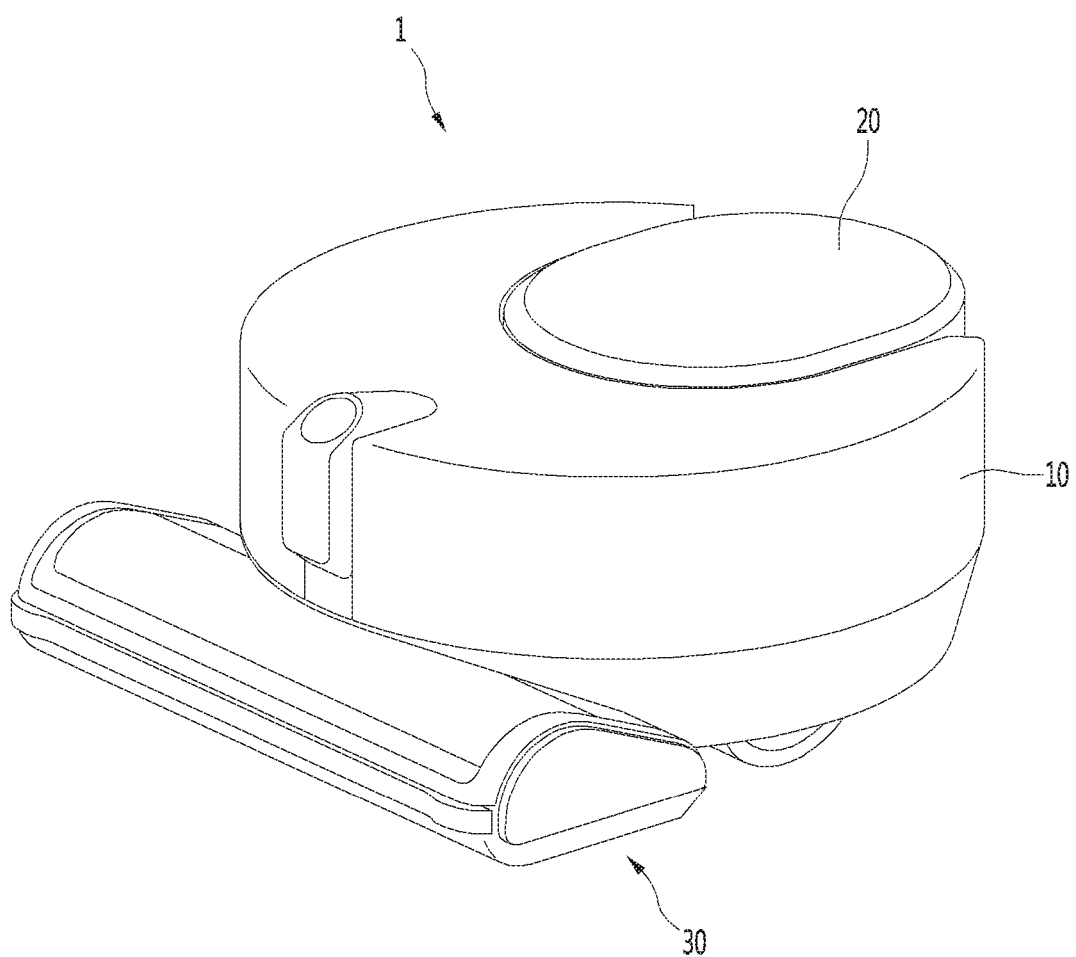
FIG. 1 is a perspective view of a robot cleaner according to a first embodiment of the present invention.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
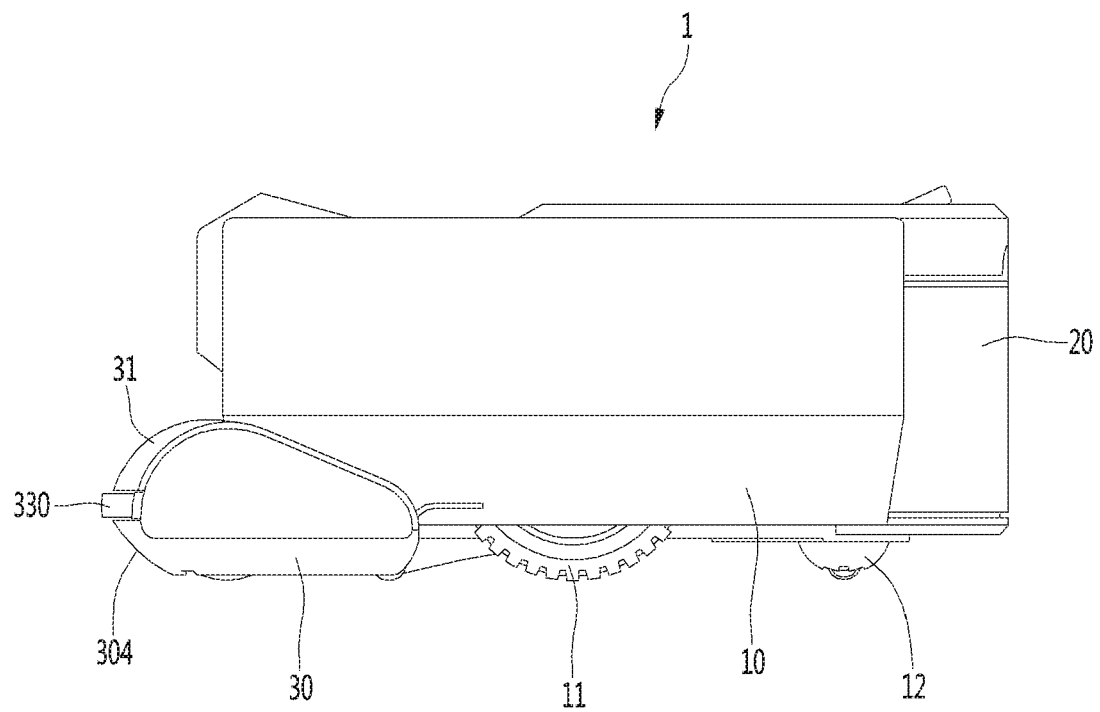
FIG. 2 is a side view of the robot cleaner according to the first embodiment of the present invention
Figure 3:
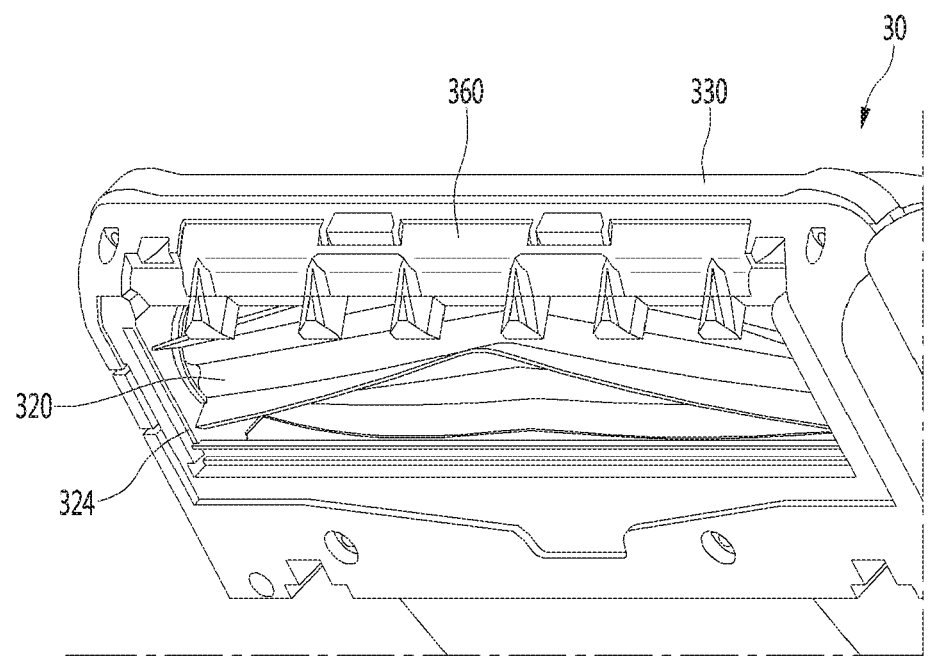
FIG. 3 is a view illustrating a lower portion of the nozzle in the robot cleaner of FIG. 1.

FIG. 1 is a perspective view of a robot cleaner according to a first embodiment of the present invention, FIG. 2 is a side view of the robot cleaner according to the first embodiment of the present invention, and FIG. 3 is a view illustrating a lower portion of the nozzle in the robot cleaner of FIG. 1.

Referring to FIGS. 1 to 3, a robot cleaner 1 according to the first embodiment of the present invention may include a body 10 having a suction motor (not illustrated) to generate suction force.

The body 10 may have, but is not limited to, a cylindrical shape. The height of the body 10 may be designed to be smaller than the radius of the body 10 such that the body 10 is prevented from interfering with obstacles when the body 10 cleans up the floor surface while traveling automatically.

The body 10 may include a main wheel 11 to move and a sub-wheel 12 to assist the movement. The main wheel 11 may be connected to a driving motor (not illustrated) and rotated.

The robot cleaner 1 may further include a nozzle 30 provided in front of the body 10 and a dust container 20 detachably provided in the body 10.

The dust on the floor surface may be suctioned into the body 10 through the nozzle 30. The dust may be separated from air suctioned into the body 10, and the separated dust may be stored.

The dust container 20 may be positioned at the opposite side to the nozzle 30 in the body 10. For example, the dust container 20 may be positioned at the rear side of the body 10.

A portion of the nozzle 30 may be disposed to overlap with the body 10 in a vertical direction, and a remaining portion of the nozzle 30 may protrude forward from the body 10.

The height of a front protrusion part 31 protruding toward a front portion of the body 10 from the nozzle 30 is lower than the height of the body 10.

Therefore, the robot cleaner 1 may enter a space having a height lower than the height of the body 10 in the process that the robot cleaner 1 cleans up the floor. Accordingly, an area cleanable by the robot cleaner 1 may be increased.

The nozzle 30 further includes a suction port 324 to suction air including dust and a rotation cleaning unit 320 disposed above the suction port 324 in the nozzle 30.

The rotation cleaning unit 320 may include, but is not limited to, a brush or a blade-type rubber. The rotation cleaning unit 320 may brush dust off the floor surface and lift the dust up, during the rotation process. It should be recognized that the rotation cleaning unit 320 may have various structures According to the present embodiment.

The nozzle 30 may further include a bumper 330 to absorb an impact when colliding with an obstacle. Although the present invention is not limited, the bumper 330 may be formed of various materials capable of absorbing the impact. When colliding with the obstacle, the shape of the bumper 330 is deformed and/or the bumper 330 is moved backward to absorb the impact.

The bumper 330 may be provided on the entire front portion of the nozzle 30 or on a portion of the nozzle 30. However, as the bumper 330 is positioned at the foremost end portion of the nozzle 30, the bumper 330 may first come into contact with an obstacle (which is higher than the minimum height of the bumper) having a specific height.

When the robot cleaner 1 meets an obstacle in the course of cleaning the floor surface, the robot cleaner 1 may avoid the obstacle or cross over the obstacle depending on the height of the obstacle.

For example, when the height of the obstacle is approximate to or lower than the height of the bumper 330, the robot cleaner 1 may cross over the obstacle.

In this case, preferably, an inclined surface 304 may be formed on the nozzle 30 such that the robot cleaner 1 easily crosses over the obstacle.

The inclined surface 304 may be inclined downward from one point of the nozzle 30 toward the rear portion of the nozzle 30. Therefore, when the obstacle comes into contact with the inclined surface 304 in the process that the robot cleaner 1 moves forward, the nozzle 30 is lifted from the robot cleaner 1 due to the inclined surface 304. Accordingly, the main wheel 11 of the robot cleaner 1 may easily cross over the obstacle.

The inclined surface 304 may be positioned under a portion of the nozzle 30 where the bumper 330 is positioned.

As described above, since the inclined surface 304 exists at a front portion of the nozzle 30, the suction port 324 may be positioned in back of the inclined surface 304 in the nozzle 30.

When the suction port 324 is positioned in back of the inclined surface 304, even if the suction motor operates, the suction force of the suction motor is not applied to an area of the floor surface corresponding to the lower portion of the inclined surface 304, so the corner may not be smoothly cleaned up.

Therefore, to smoothly clean up the corner according to the present invention, the nozzle 30 may further include a movable unit 360 protruding forward from the inclined surface 304 to form a surface pressure in relation to the floor.

For example, the movable unit 360 may be rotatably coupled to the nozzle 30. The movable unit 360 may protrude from the nozzle 30 by rotating in one direction. In this state, the surface pressure is increased by a narrow gap between the movable unit 360 and the floor surface, so the dust at the corner may be moved toward the suction port 324.

Meanwhile, the movable unit 360 may be received in the nozzle 30 having the inclined surface 304 or may overlap with the nozzle 30, by rotating in an opposite direction, so the movable unit 360 is prevented from being interrupted when the robot cleaner 1 crosses over an obstacle.

Hereinafter, the nozzle will be described in detail.

Figure 4:
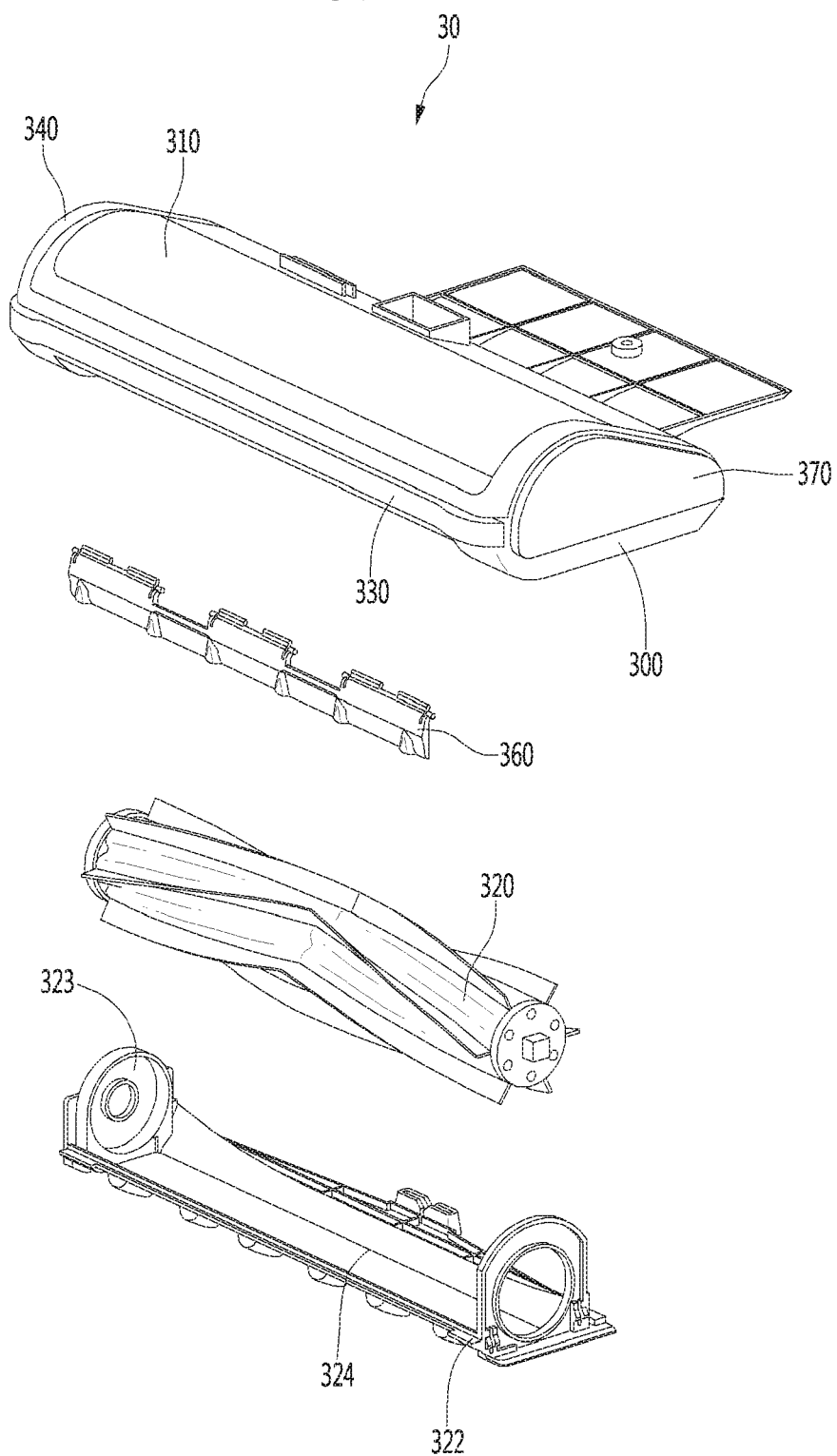
FIG. 4 is an exploded perspective view of the nozzle according to the first embodiment of the present invention.
Figure 5:
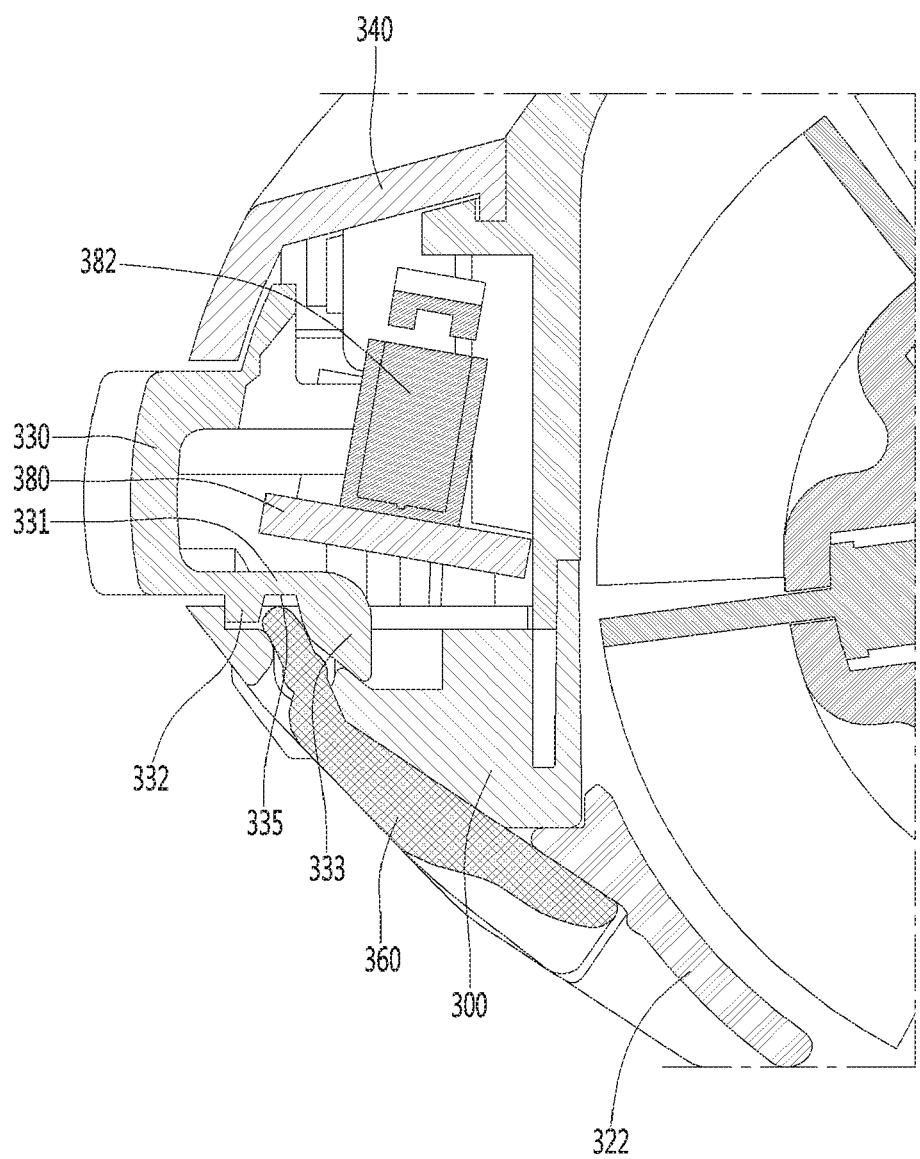
FIG. 5 is a cross-sectional view of the nozzle according to the first embodiment of the present invention.
Figure 6:
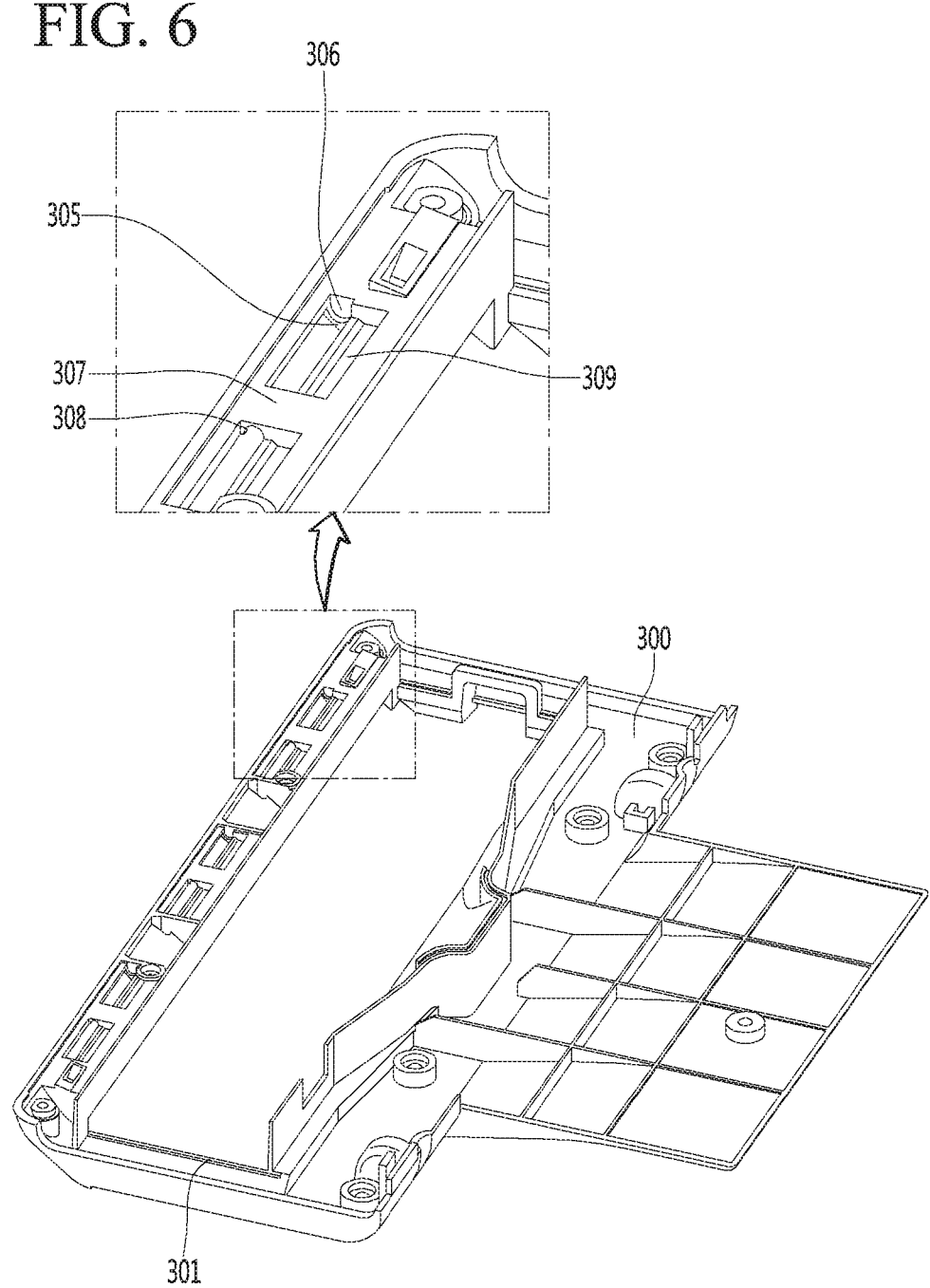
FIG. 6 is a perspective view of a base according to the first embodiment of the present invention.

FIG. 4 is an exploded perspective view of the nozzle according to the first embodiment of the present invention, FIG. 5 is a cross-sectional view of the nozzle according to the first embodiment of the present invention, and FIG. 6 is a perspective view of a base according to the first embodiment of the present invention.

Referring to FIGS. 4 to 6, the nozzle 30 may include a base 300 (or a first body) and a cover member 310 (or a second body) to cover an upper portion of the base 300 Body).

The base 300 and the cover member 310 define a space to receive accommodating the rotation cleaning unit 320.

At least one of the base 300 and the cover member 310 may include a guide part to guide air to the body 10.

The base 300 may have an opening 301 through which the rotation cleaning unit 320 passes to mount the rotation cleaning unit 320.

The bumper 330 may be seated at a front portion of the base 300 in a state where the base 300 and the cover member 310 are coupled to each other. For another example, it is also possible that the bumper 330 is mounted on the cover member 310.

The frame member 340 may surround the rim of the cover member 310 and may cover an upper portion of the bumper 330, in the state that the bumper 330 is seated on the base 300. Alternatively, the frame member 340 may be integrally formed with the cover member 310 without separating from the cover member 310.

Side covers 370 may be coupled to opposite sides of the nozzle 30.

Opposite ends of the bumper 330 may be coupled to the side covers 370 or may be coupled to the cover member 310. A sensor 382 and a printed circuit board 380, on which the sensor 382 is mounted, may be between the front surface of the cover member 310 and the bumper 330.

The nozzle 30 may further include a base cover 322 to support the rotation of the rotation cleaning unit 320 and to cover the lower portion of the rotation cleaning unit 320. The base cover 322 may be inserted into the opening 301 of the base 300.

The base cover 322 may include a support part 323 to support the rotation cleaning unit 320 and a suction port 324.

According to the embodiment, since the base cover 322 is inserted into the opening 301, it may be understood that the opening 301 defines a portion of the suction port 324.

For another example, at least a portion of the base cover 322 may be formed integrally with the base 300. For example, the support part 323 may be integrally formed with the base 300, and the base cover 322 may cover the opening 301 and the rotation cleaning unit 320.

Figure 7:
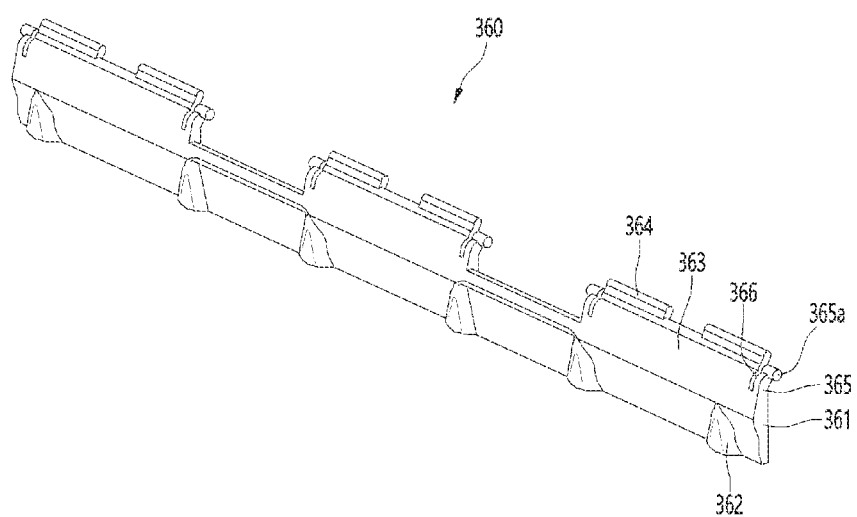
FIG. 7 is a perspective view of the movable unit according to the first embodiment of the present invention.
Figure 8:
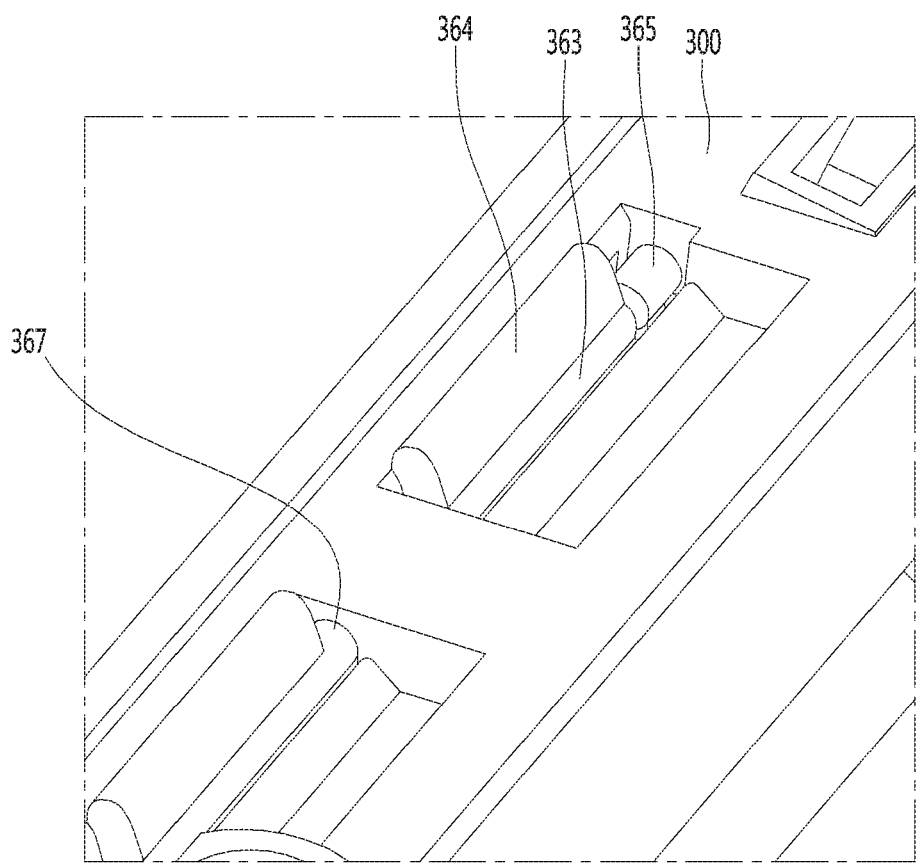
FIGS. 8 and 9 are views illustrating a state that the movable unit is coupled to the base.
Figure 9:
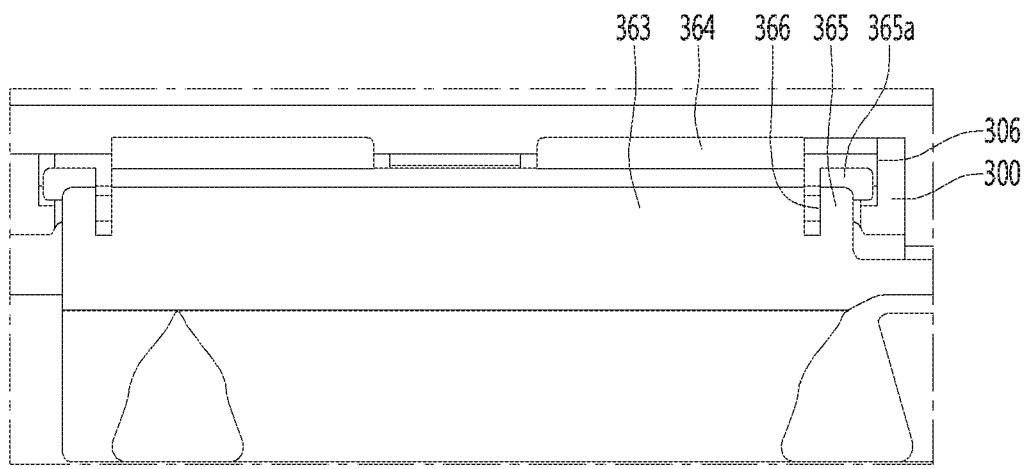
Figure 10:
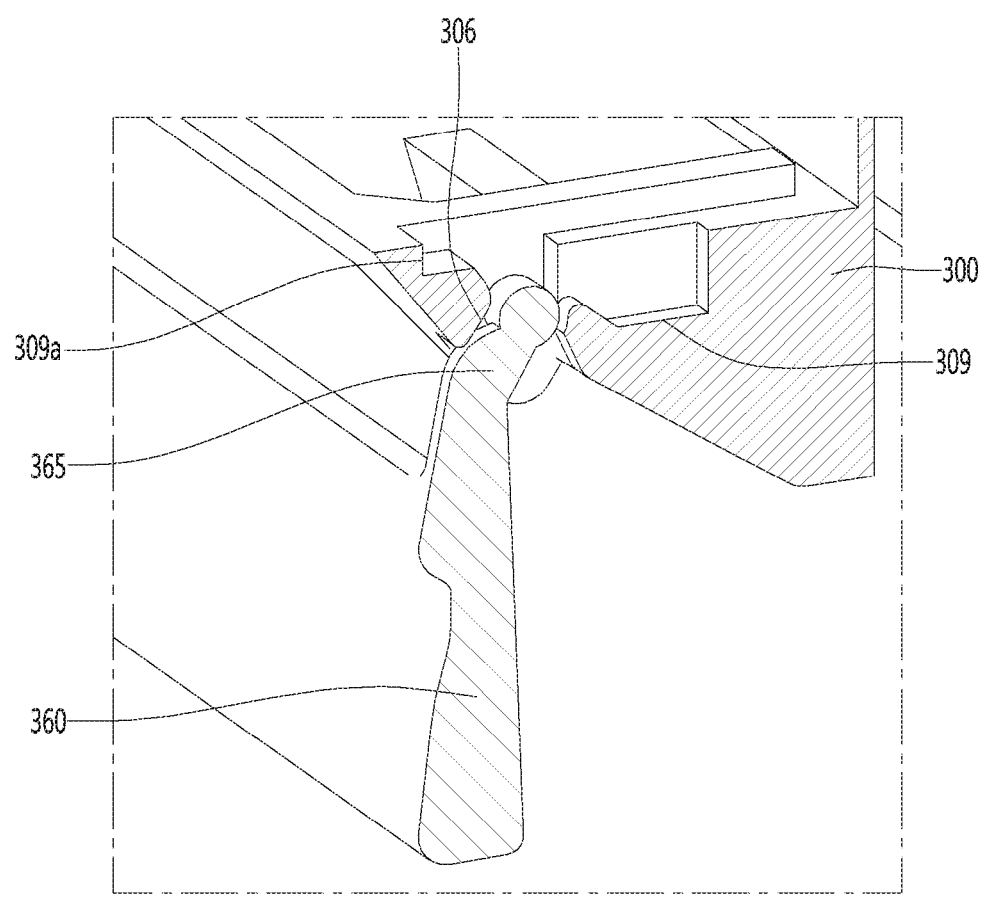
FIG. 10 is a view illustrating that a hinge part of the movable unit is coupled to the base.

FIG. 7 is a perspective view of the movable unit according to the first embodiment of the present invention, FIGS. 8 and 9 are views illustrating a state that the movable unit is coupled to the base, and FIG. 10 is a view illustrating a state that a hinge part of the movable unit is coupled to the base.

Referring to FIGS. 5 to 7, the movable unit 360 may be rotatably coupled to the base 300 by way of example.

The movable unit 360 may include a rotating body 361 and a connecting part 363 protruding upward from the rotating body 361.

The plurality of connecting parts 363 are arranged in the lengthwise direction of the rotating body 361 (in the left-right direction in FIG. 7) while being spaced apart from each other such that the movable unit 360 may be stably coupled to the base 300 and rotated.

A plurality of reinforcing protrusions 362 to reinforce the stiffness may be formed on the front surface of the rotating body 361. The plurality of reinforcing protrusions 362 may protrude forward from the front surface of the rotating body 361.

The plurality of reinforcing protrusions 362 may minimize the contact area between the obstacle and the movable unit 360 and prevent the rotating body 361 from being damaged due to the collision with the obstacle.

According to the present embodiment, the movable unit 360 may be rotated together with movement of the bumper 330.

Accordingly, the connecting part 363 may have a contact protrusion 364 for contacting with the bumper 330.

A plurality of contact protrusions 364 may be spaced apart from each other while being arranged in the lengthwise direction of the rotating body 361, in one connecting part 363, such that the moving force of the bumper 330 is effectively transmitted.

When a plurality of contact protrusions 364 are provided on each of the connecting parts 363, even if one point (local area) of the bumper 330 is pressed by an obstacle or the like, the moving force of the bumper 330 may be transmitted to the connecting part 363.

The rotating body 361 may have a hinge part 365 to be rotated.

Hinge parts 365 may be positioned at opposite sides of each connecting part 363 such that the rotating body 361 is totally stably rotated in the lengthwise direction of the rotating body 361.

A slit 366 is formed in the connecting part 363 such that the hinge part 365 may be coupled to the base 300. The hinge part 365 may be elastically deformed with respect to the connecting part 363 by the slit 366.

The base 300 may have a through hole 305 through which the contact protrusion 364 passes.

For example, a plurality of protrusion-through holes 305 may be formed in the base 300 while being spaced apart from each other in the left-right direction.

The movable unit 360 may be coupled to the base 300 upward from the lower portion of the base 300. Therefore, the contact protrusion 364 passes through the protrusion-through hole 305 from the lower portion of the protrusion-through hole 305.

The base 300 may further include a stopper 307 positioned between two adjacent protrusion-through holes 305. The connecting part 363 may be come into contact with the stopper 307 while the contact protrusion 364 passes through the protrusion-through hole 305.

Since the connecting part 363 is rotated together with the rotating body 361, the connecting part 363 has a round part 367 such that the connecting part 363 is stably rotated while being in contact with the stopper 307. A guide groove 308, in which the round part 367 is received, may be formed in the stopper 307.

A seating groove 306 is formed in the base 300 such that the hinge part 365 is seated at the side of the protrusion-through hole 305.

Even the hinge part 365 may pass through the protrusion-through hole 305 when the contact protrusion 364 passes through the protrusion-through hole 305.

Each of the hinge parts 365 includes a shaft 365a protruding outward. One hinge part and one contact protrusion part 364 pass through one protrusion-through hole 305. In this case, the maximum distance between the contact protrusion 364 and the shaft 365a may be greater than the width of the protrusion-through hole 305.

The hinge part 365 is elastically deformed in a direction that the hinge part 365 is closer to the contact protrusion 364 in the process that the hinge part 365 passes through the protrusion-through hole 305. After the hinge part 365 passes through the protrusion-through hole 305, the hinge part 365 may return to its original state and the hinge part 365 may be seated in the seating groove 306.

In the state that the hinge part 365 is seated in the seating groove 306, the hinge part 365 is prevented from moving downward, due to the seating groove 306. In other words, when the movable unit 360 is coupled to the base 300, the movable unit 360 is prevented from being separated from the base 300 as long as the user intentionally deforms the hinge part 365.

According to the present embodiment, the seating groove 306 and the hinge part 365 restrict the downward-movement of the movable unit 360, and the stopper 307 restricts the upward-movement of the movable unit 360. The movable unit 360 becomes stably rotatable with respect to the base 300.

Figure 11:
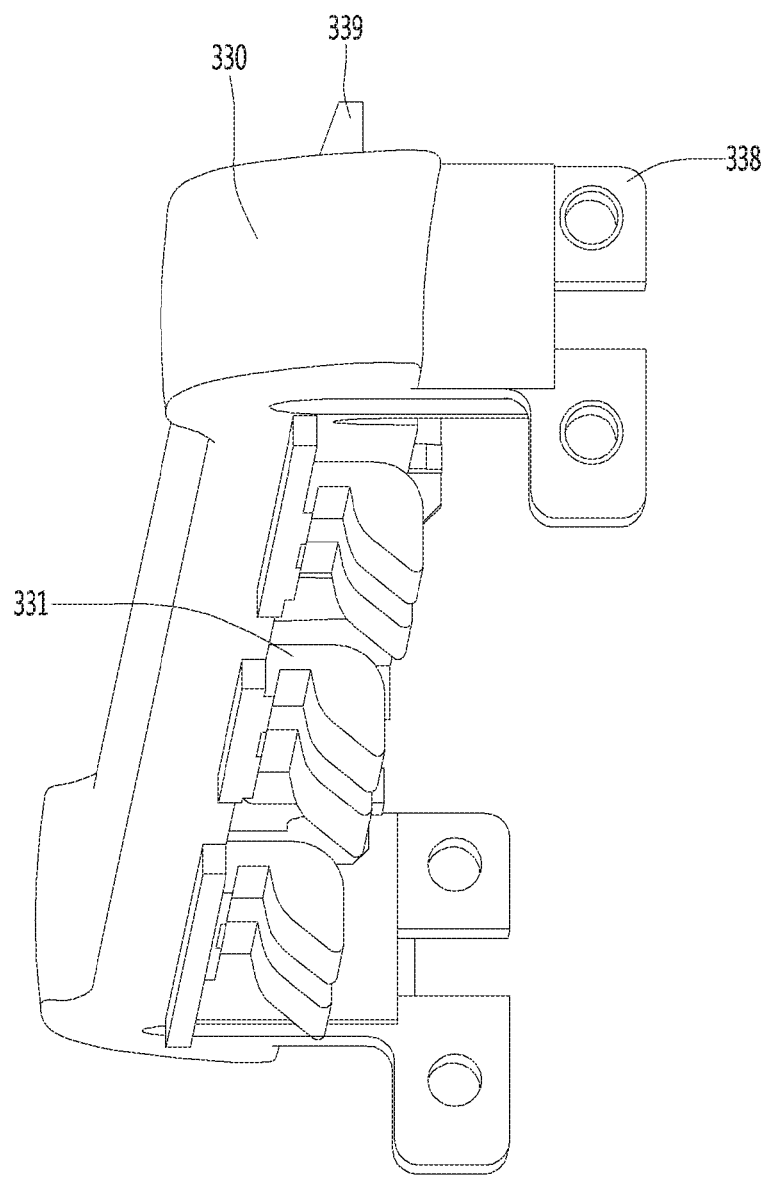
FIGS. 11 and 12 are views illustrating a bumper, according to a first embodiment of the present invention.
Figure 12:
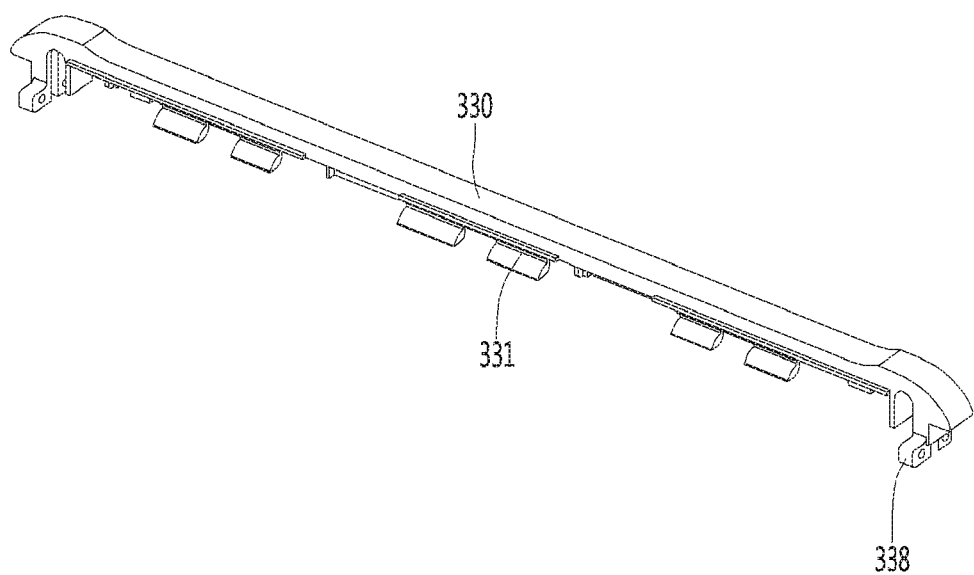

FIGS. 11 and 12 are views illustrating a bumper, according to a first embodiment of the present invention.

Referring to FIGS. 5 to 12, the bumper 330 may include a transmission part 331 for transmitting the actuation force of the bumper 330 to the contact protrusion 364 of the movable unit 360.

For example, a plurality of transmission parts 331 may be disposed while being spaced apart from each other in the left-right direction of the bumper 330. In addition, each of the transmitting parts 331 may be in contact with the respective contact protrusions 364.

The transmission part 331 includes a first part 332 positioned in front of the contact protrusion 364 and a second part 333 spaced apart from the first part 332 in back of the first part 332. A portion of the contact protrusion 364 may be interposed in a space 335 between the first part 332 and the second part 333.

The base 300 may have a locking protrusion 309a to which the first part 332 is locked. The forward-movement of the locking protrusion 309a is restricted when the first part 332 is locked to the locking protrusion 309a.

For example, in a state that an external force is not applied to the bumper 330, the first part 332 may be locked to the locking protrusion 309a, thereby restricting the forward-movement of the bumper 330.

The upper end of the contact protrusion 364 is positioned higher than the shaft 365a of the hinge part 365 in a state that the movable unit 360 is coupled to the base 300.

The first part 332 may be in contact with or spaced apart from the contact protrusion 364 in a state that the external force is not applied to the bumper 330, and the second part 333 may press a portion of the contact protrusion 365, which is higher than the shaft 365a.

When the second part 333 presses a portion of the contact protrusion 364, which is positioned higher than the shaft 365a, as illustrated in FIG. 5, the movable unit 360 is rotated counterclockwise to be received in the nozzle 30 or to overlap with the nozzle 30. The following description will be made on the assumption that the movable unit 360 overlaps with the nozzle 30.

The base 300 may further include a receiving groove 309 to receive the second part 333.

The bumper 330 may further include fastening parts 338 for fastening with the cover member 310 or the side cover 370.

When the fastening part 338 are provided on both sides of the bumper 330 and an external force is applied to a specific region of the bumper 330, which is positioned between the fastening parts 338, a portion of the bumper 330 is moved relative to the fastening part 338.

Hereinafter, the operation of the movable unit 360 will be described.

FIGS. 13 to 16 are views illustrating, step by step, the appearance that the movable unit is rotated in the process that an obstacle collides with the bumper of the robot cleaner, according to the first embodiment of the present invention.

Figure 13:
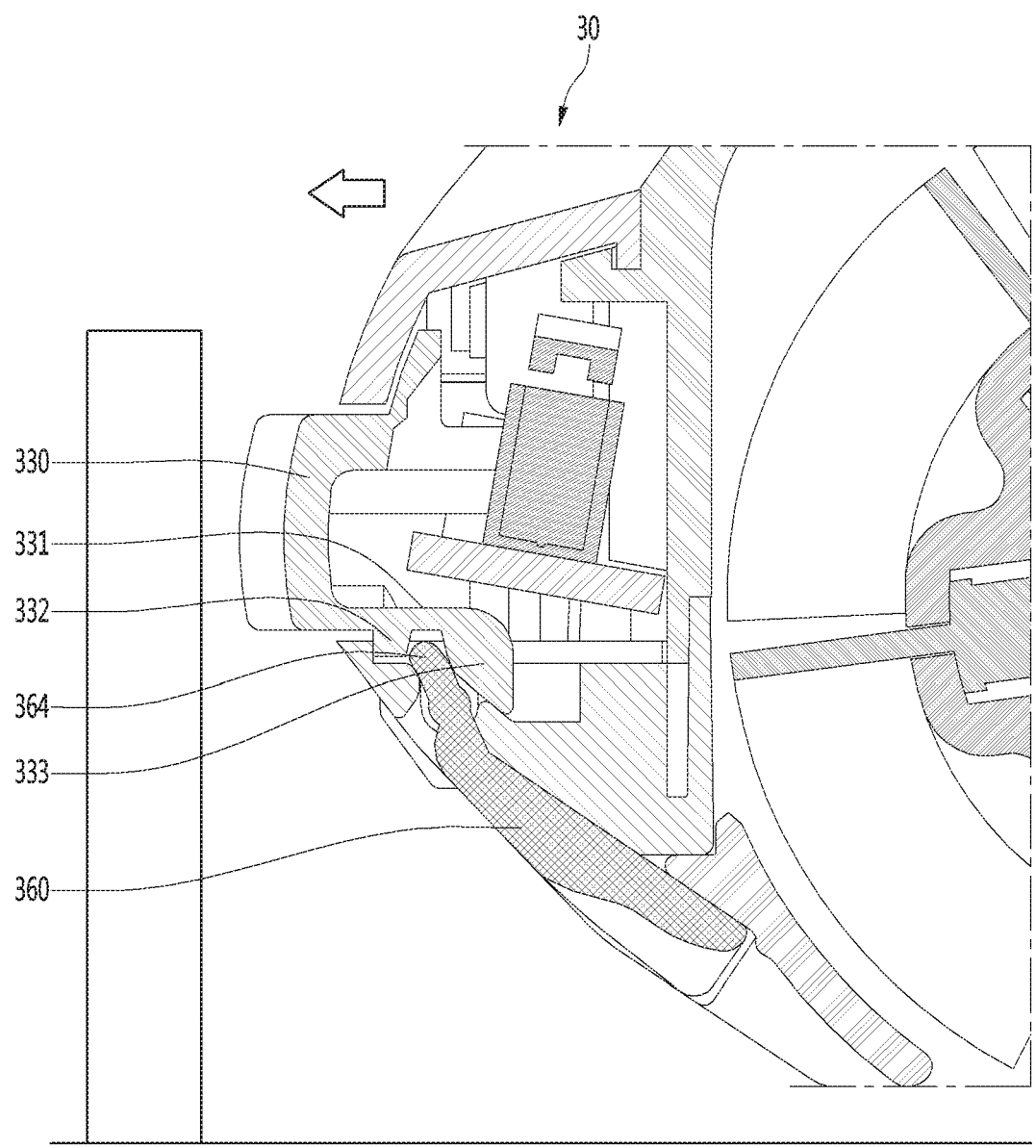
FIGS. 13 to 16 are views illustrating, step by step, the appearance that the movable unit is rotated in the process that an obstacle collides with the bumper of the robot cleaner, according to the first embodiment of the present invention.
Figure 14:
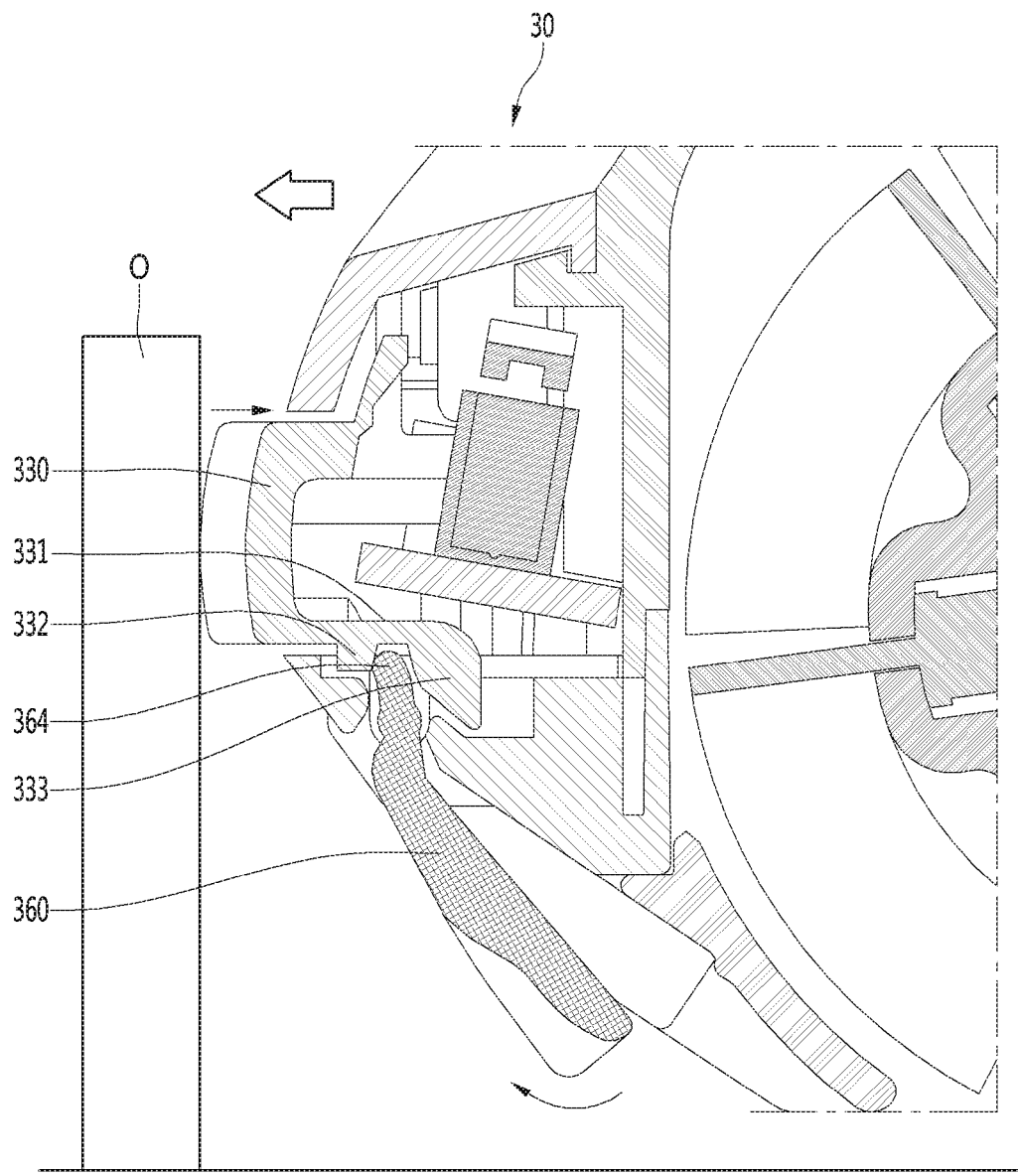
Figure 15:
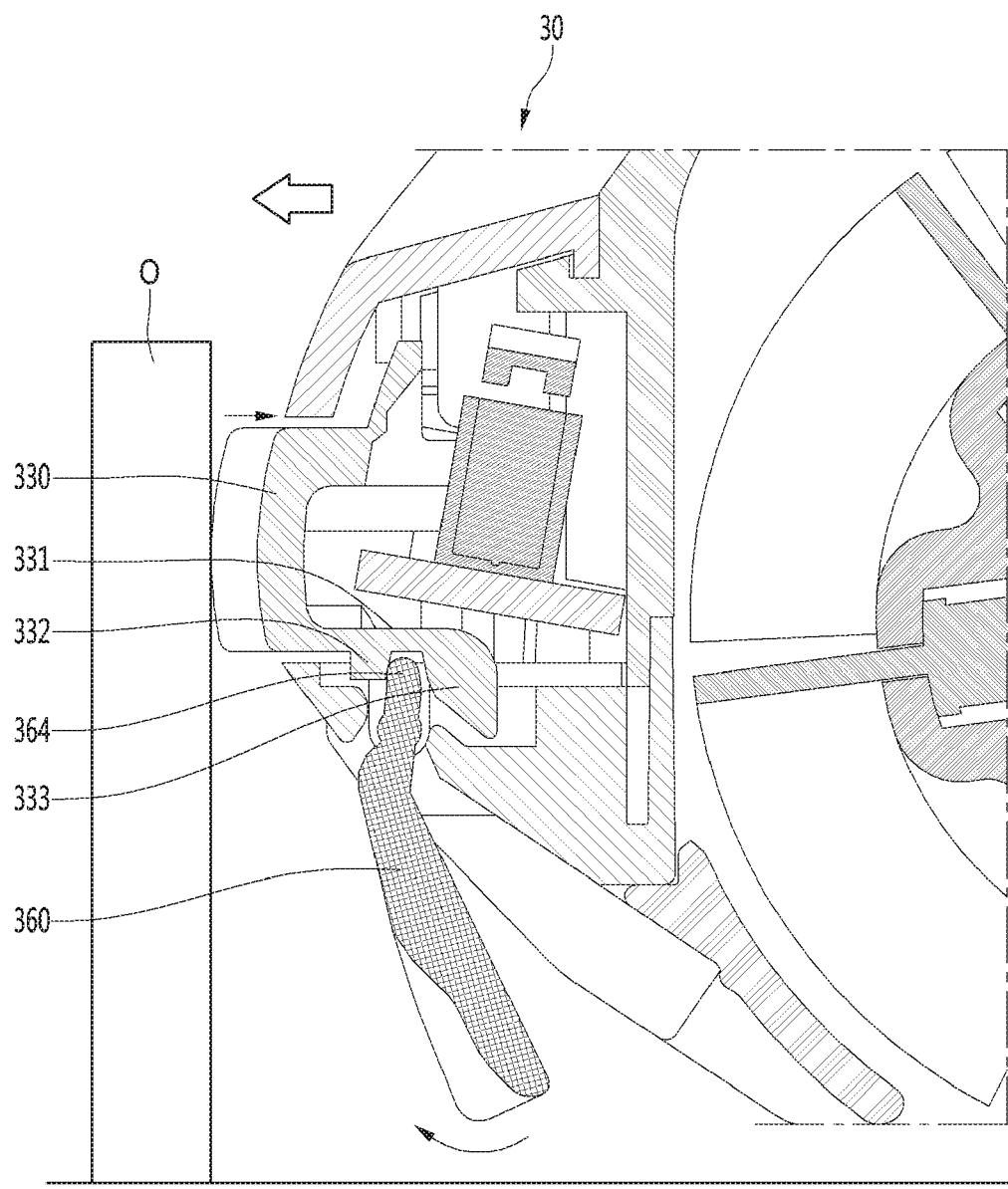

First, referring to FIG. 13, in the state that external force is not applied to the bumper 330, the second part 333 of the transmission part 331 presses the contact protrusion part 364, so the movable unit 360 is present in the state of overlapping with the nozzle 30.

According to the present embodiment, the position of the movable unit 360 in a state that the movable unit 360 overlaps with the nozzle 30 may be referred to as a first position of the movable unit 360. In the state that the movable unit 360 is positioned at the first position, the front surface of the movable unit 360 may be arranged to be inclined at a predetermined angle with respect to the vertical line.

In this state, the robot cleaner 1 may be in contact with an obstacle O such as a wall in the process that the robot cleaner 1 moves forward.

The obstacle O, such as a wall, may be generally first in contact with the bumper 330 of the nozzle 30. When the robot cleaner 1 moves forward continuously, the bumper 330 is pressurized to be deformed, such that at least a portion of the bumper 330 moves backward.

When the bumper 330 moves backward, the first part 332 of the transmission part 331 pushes the contact protrusion 364 backward so that the movable unit 360 is rotated clockwise when viewed in the drawing.

Figure 16:
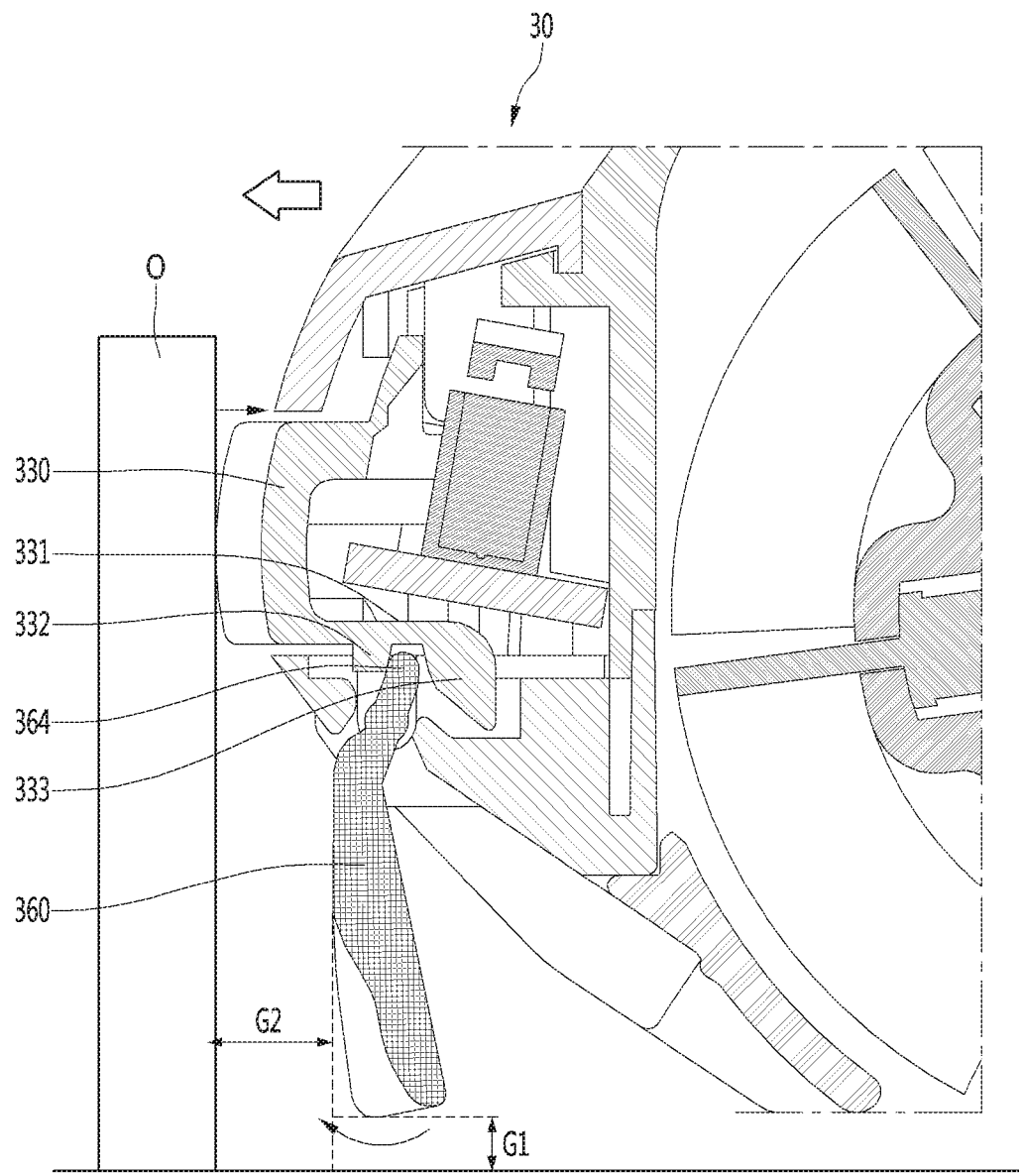

When the movable unit 360 is rotated, the movable unit 360 protrudes forward from the inclined surface of the nozzle 30. The movable unit 360 may be positioned perpendicular to the floor or nearly perpendicular to the floor, as illustrated in FIG. 16 in the maximum rotation.

In that state that the movable unit 360 is rotated at the maximum, the front surface of the movable unit 360 may be positioned in back of the front end of the bumper 330 and may be spaced apart from the front end of the bumper 330 by G2.

When the front surface of the movable unit 360 is positioned in the front of the front end of the bumper 330 as described above, the obstacle O, such as the wall, is prevented from directly being in contact with the movable unit 360, so the damage to the movable unit 360 may be minimized.

In the state in which the movable unit 360 is rotated at the maximum, the lower end of the movable unit 360 may be spaced apart from the floor by G1.

According to the present embodiment, the position of the movable unit 360 in the state that the movable unit 360 protrudes in front of the inclined surface of the nozzle 30 at the maximum may be referred to as a second position of the movable unit 360.

When the movable unit 360 is rotated, a gap G1 between the lower end of the movable unit 360 and the floor generates a surface pressure between the movable unit 360 and the floor, so the suction force of the suction motor is applied to the area that the movable unit 360 is positioned, thereby improving the corner cleaning performance. To the contrary, as the gap between the lower end of the movable unit 360 and the floor is increased, the surface pressure is reduced, so the corner cleaning performance is deteriorated.

When the gap between the lower end of the movable unit 360 and the floor is significantly narrow or the lower end of the movable unit 360 makes contact with the floor, foreign matters placed on the floor are moved in a direction away from the nozzle 30 in the process that the movable unit 360 moves from the first position to the second position. The foreign matters may not be suctioned.

Therefore, the gap between the lower end of the movable unit 360 and the floor may be set to a value in a range of 2 mm to 8 mm, for example, in consideration of foreign matter suction and cleaning performance.

According to the suggested embodiment, since the movable unit protrudes forward from the inclined surface of the nozzle, the suction force may be applied to an area where the movable unit is positioned, and the corner may be cleaned up.

According to the present embodiment, since the moving force of the bumper is transmitted to the movable unit without any additional operation of the movable unit, the convenience of the user is improved and the possibility that an obstacle collides with the movable unit may be reduced.

According to the present embodiment, since the movable unit may overlap with the nozzle, the robot cleaner may easily cross over the obstacle without interference between the movable unit and the obstacle.

Figure 17:
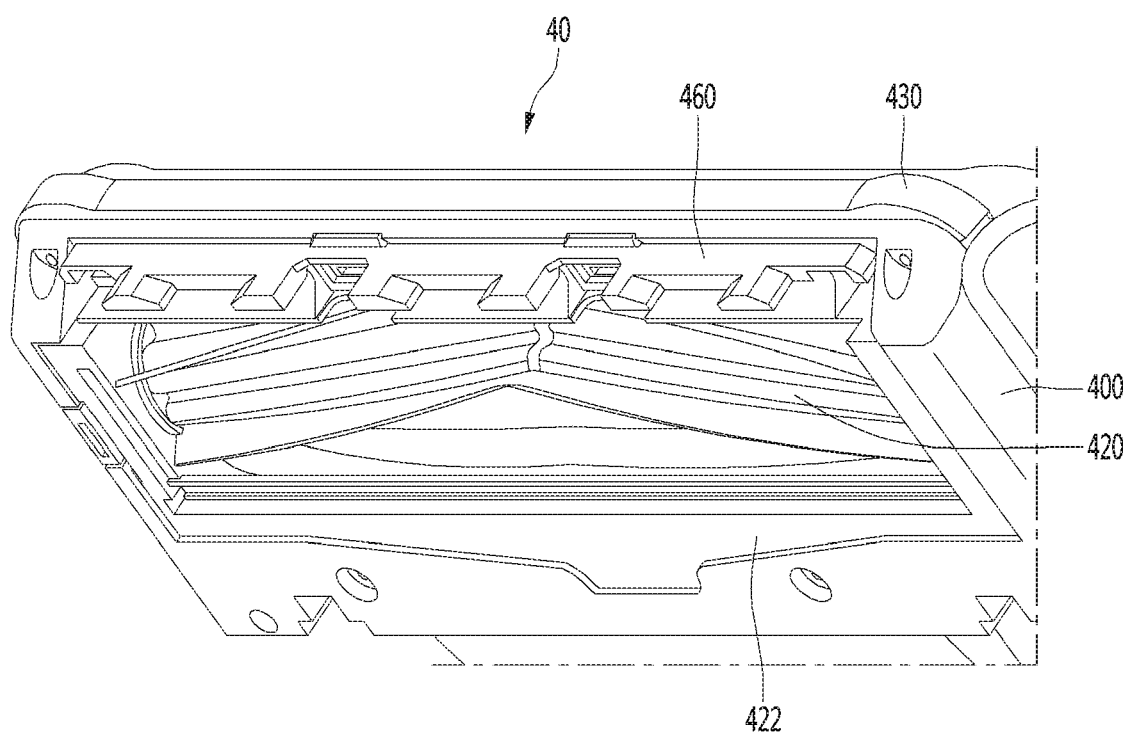
FIG. 17 is a perspective view illustrating a lower structure of a nozzle according to a second embodiment of the present invention
Figure 18:
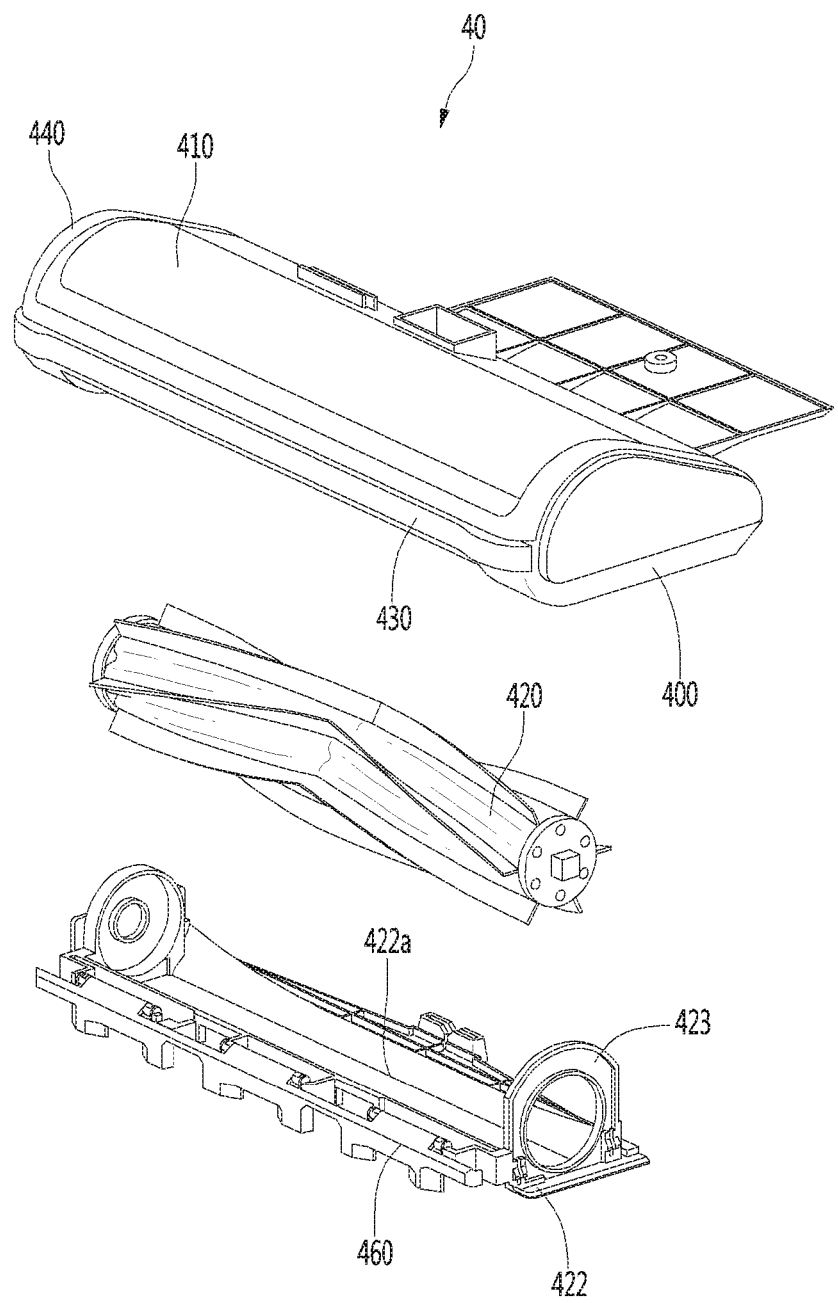
FIG. 18 is an exploded perspective view of the nozzle of FIG. 17.

FIG. 17 is a perspective view illustrating a lower structure of a nozzle according to a second embodiment of the present invention, and FIG. 18 is an exploded perspective view of the nozzle of FIG. 17.

The present embodiment is the same as the first embodiment except for the coupling position and the structure of the movable unit. Therefore, only the feature parts of the present embodiment will be described below.

Referring to FIGS. 17 and 18, a nozzle 40 according to the present embodiment may include a base 400 and a cover member 410 covering the upper portion of the base 400.

The nozzle 40 may further include a rotation cleaning unit 420 rotated in a space defined by the base 400 and the cover member 410.

A bumper 430 may be seated at a front portion of the base 400 in the state that the base 400 and the cover member 410 are coupled to each other.

A frame member 440 may surround the rim of the cover member 410 while the bumper 430 is seated on the base 400 and may cover the upper side of the bumper 430. Alternatively, the frame member 440 may not be provided as a separate component, but may be formed integrally with the cover member 410.

The nozzle 40 may further include a base cover 422 to support the rotation of a rotation cleaning unit 420 and to cover the lower portion of the rotation cleaning unit 420.

The base cover 422 may include a support portion 423 to support the rotation cleaning unit 420 and a suction port 422a to suction air containing foreign matter.

The nozzle 40 may further include a movable unit 460 protruding from an inclined surface of the nozzle 40 to form a surface pressure in relation to the floor. The movable unit 460 may be movably installed in the base cover 420.

Figure 19:
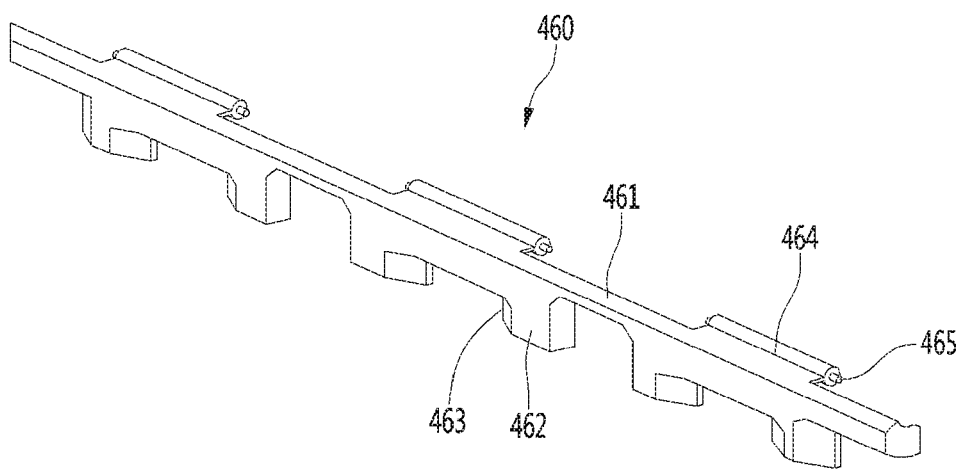
FIGS. 19 and 20 are perspective views of a movable unit according to a second embodiment of the present invention.
Figure 20:
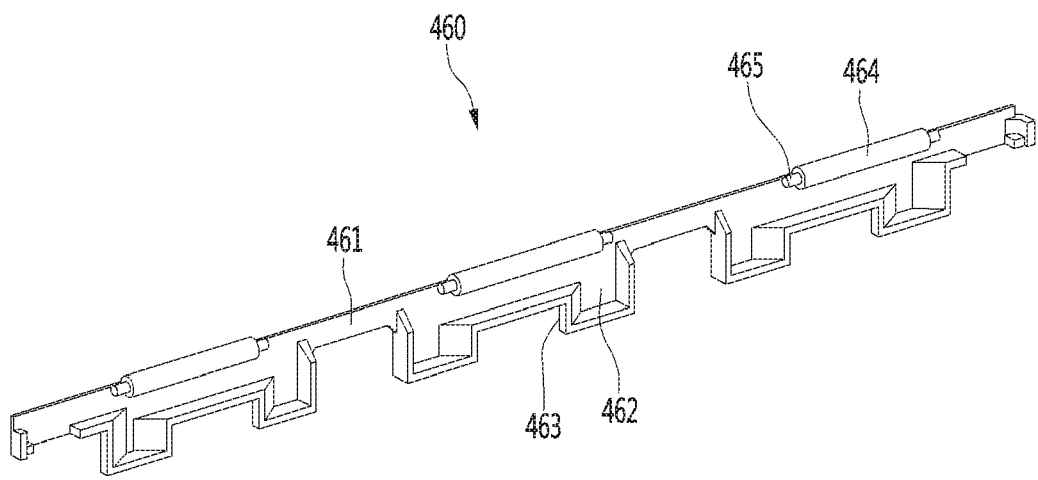
Figure 21:
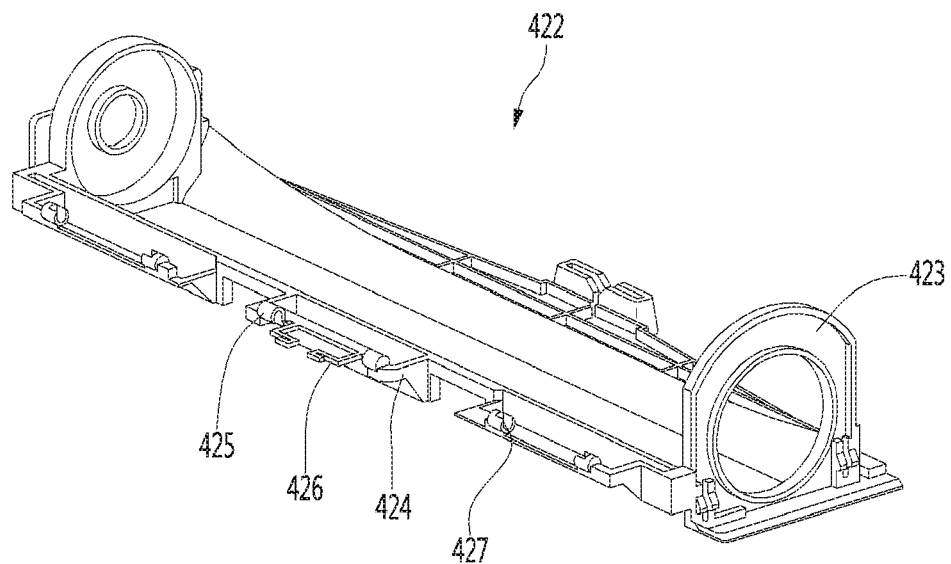
FIGS. 21 and 22 are perspective views of a base cover according to the second embodiment of the present invention.
Figure 22:
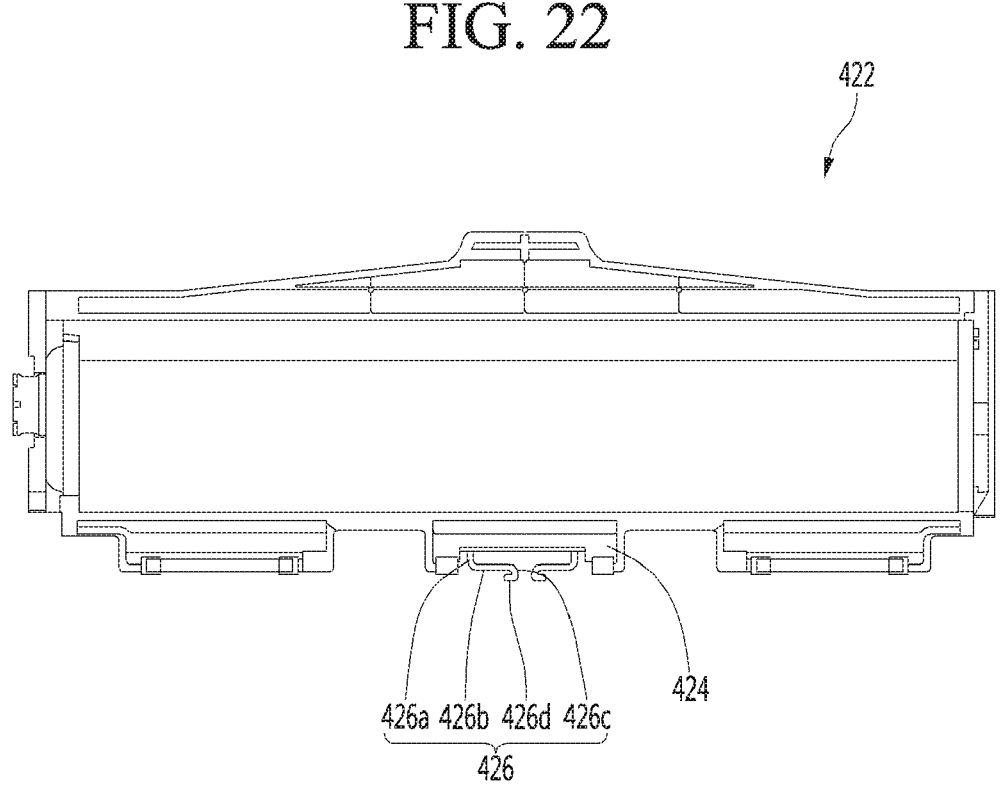

FIGS. 19 and 20 are perspective views of a movable unit according to a second embodiment of the present invention, and FIGS. 21 and 22 are perspective views of a base cover according to the second embodiment of the present invention.

Referring to FIGS. 19 to 22, a movable unit 460 may be rotatably coupled to a base cover 422.

The movable unit 460 may include a rotating body 461.

The rotating body 461 may include a plurality of extension parts 462 spaced apart from each other in the lengthwise direction of the rotating body 461. The plurality of extension parts 462 form a surface pressure in relation to the floor in the state in which the rotating body 461 is rotated to protrude forward from the inclined surface of the nozzle 40.

According to the present embodiment, when the plurality of extension parts 462 are disposed while being spaced apart from each other, the space between the plurality of extension parts 462 may serve as a passage through which foreign matter passes.

Accordingly, the foreign matter may pass through the space between the extension parts 462 and move toward the suction port 422a of the nozzle 40.

In addition, the plurality of extension parts 462 may have openings 463 through which foreign substances may pass.

According to the present embodiment, when the opening 463 is not present in the extension part 462, and when the nozzle 40 is moved in the state that the rotating body 461 is rotated to protrude forward from the nozzle 40, a foreign matter positioned in front of the rotating body 461 is caught by the extension part 462 and does not move toward the suction port 422a of the nozzle 40.

Meanwhile, according to the present embodiment, when the opening 463 is provided in the extending portion 462, the foreign matter positioned in front of the extending portion 462 may move to the suction port 422a of the nozzle 40 through the opening 463.

The rotating body 461 may further include a first coupling part 464 for coupling to the base cover 422. A shaft 465 for a rotation operation may be formed at opposite sides of the first coupling part 464.

In the state that the rotating body 461 is coupled to the base cover 422, a plurality of first coupling parts 464 are arranged to be spaced apart from each other in a lengthwise direction of the rotating body 461, such that the entire portion of the rotating body 461 and the base cover 422 are stably rotated about the lengthwise direction of the rotating body 461.

Meanwhile, the base cover 422 may include a second coupling part 424 for the engagement of the first coupling part 464 of the movable unit 460.

For example, a plurality of second coupling parts 424 may be disposed while being spaced apart from the base cover 422.

For example, the second coupling part 424 may be positioned in front of the base cover 422.

The second coupling part 424 may include a shaft coupling part 425 to which the shaft 465 of the first coupling part 464 is coupled.

The shaft coupling part 425 may have a slit 427 to allow the shaft 465 to be inserted in a direction crossing the extending direction of the shaft 465.

The nozzle 40 may further include an elastic member 426 to press forward the rotating body 461 in the state that the first coupling part 464 is coupled to the second coupling part 424.

The elastic member 426 may be formed integrally with the base cover 422 and may be a protrusion bent multiple times.

For example, the elastic member 426 includes a first part 426a extending forward from the second coupling part 424, a second part 426b extending laterally from the first part 426a, and a third portion 426c extending forward in the second part 426b. In addition, the elastic member 426 may further include a fourth portion 426d extending laterally from the third portion 426c.

In this case, the extending direction of the second part 426b and the extending direction of the fourth part 426d may be opposite to each other.

The elastic member 460 is in contact with the back surface of the rotating body 461 in the state that the first coupling part 464 is coupled to the second coupling part 424.

The elastic member 426 supports the back surface of the rotating body 461 due to the shape and arrangement of the elastic member 426 so that the rotating body 461 protrudes from the inclined surface of the nozzle 40.

When the rotating body 461 is pressed by an obstacle or the like, the elastic member 426 is elastically deformed to accumulate the elastic force. The rotating body 461 may be rotated backward. When the external force is removed from the rotating body 461, the rotating body 461 may be rotated forward again due to the elastic force of the elastic member 426.

According to the present embodiment, a plurality of elastic members 426 may be arranged to support one extension part 462 so that elastic force may be uniformly transmitted to the rotating body 461.

The plurality of elastic members 426 may have the same shape and may be arranged to be symmetrical to each other.

Figure 23:
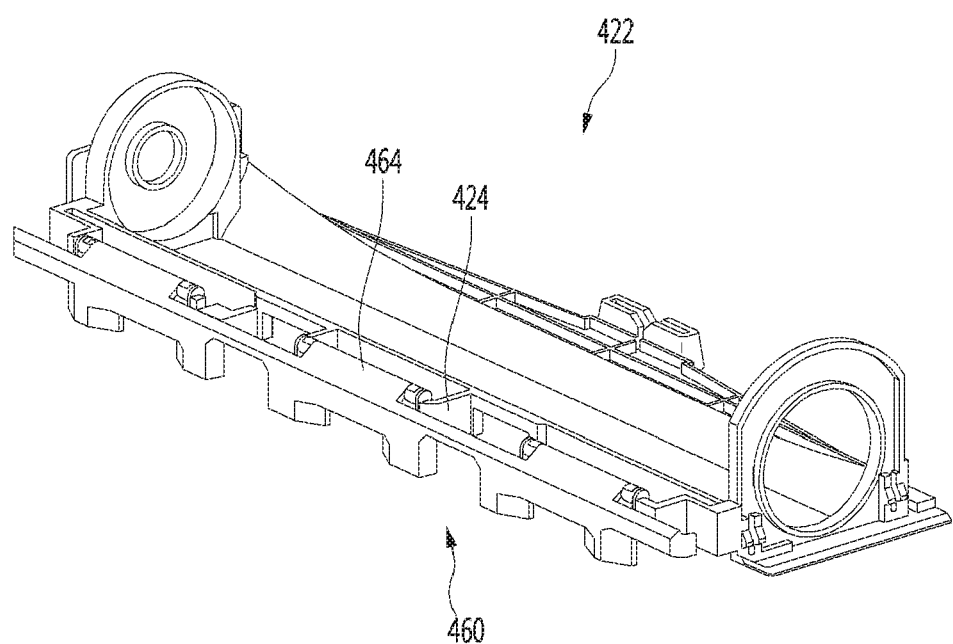
FIG. 23 is a perspective view illustrating a state that the movable unit is coupled to the base, according to the second embodiment of the present invention.
Figure 24:
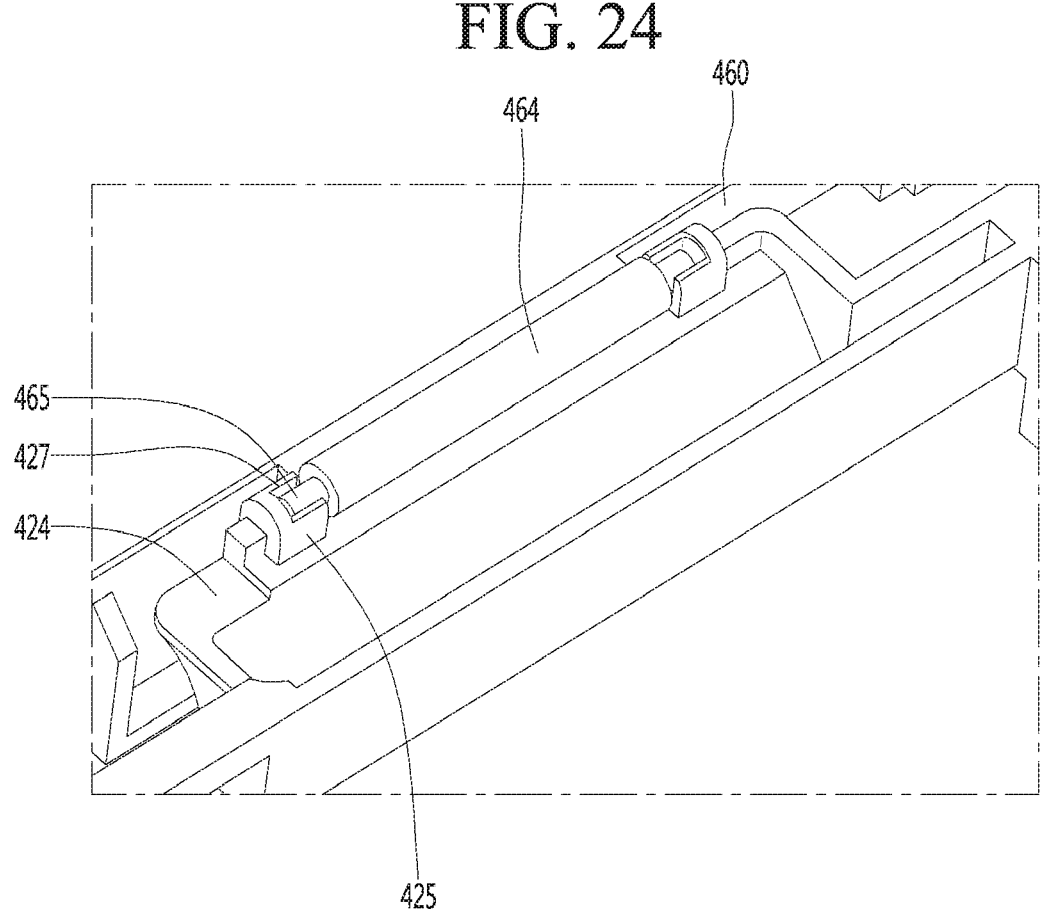
FIG. 24 is a perspective view illustrating the state that a first coupling part of the movable unit is coupled to a second coupling part of the base cover, according to the second embodiment of the present invention.
Figure 25:
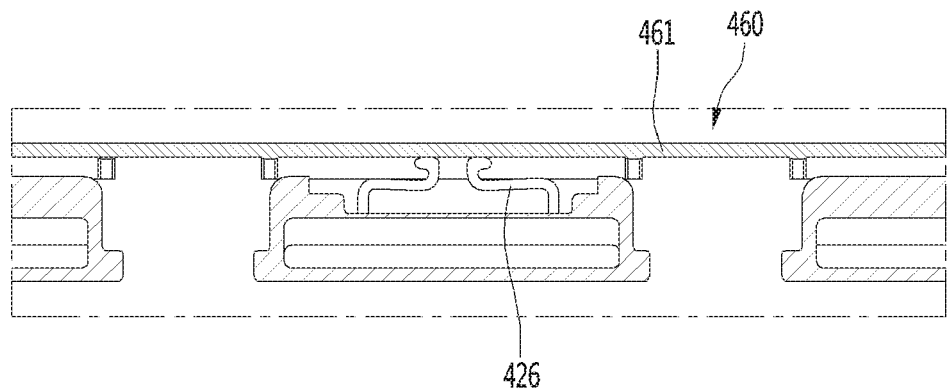
FIG. 25 is a perspective view illustrating the state that the elastic member of the base cover supports the rotating body of the movable unit, according to the second embodiment of the present invention.

FIG. 23 is a perspective view illustrating a state that the movable unit is coupled to the base according to the second embodiment of the present invention, FIG. 24 is a perspective view illustrating the state that a first coupling part of the movable unit is coupled to a second coupling part of the base cover, according to the second embodiment of the present invention, and FIG. 25 is a perspective view illustrating a state that the elastic member of the base cover supports the rotating body of the movable unit, according to the second embodiment of the present invention.

Referring to FIGS. 23 to 25, each of a plurality of first coupling parts 464 of the movable unit 460 may be coupled to the second coupling part 424 of the base cover 422.

According to the present embodiment, shafts 465 of some of first coupling parts 464 may be fitted into the shaft coupling part 425 in the first direction, and shafts 465 of others of the first coupling parts 464 may be fitted into the shaft coupling part 425 in a second direction opposite to the first direction.

For example, when the movable unit 460 includes three first coupling parts 464, the shaft 465 of the intermediate first coupling parts 464 is coupled into the second coupling part 424, upward from the lower portion of the second coupling part 424. Meanwhile, shafts 465 of the reaming two first coupling part 464 may be fitted into the shaft coupling parts 425 downward from the upper portion of the second coupling parts 424.

This is to prevent the movable unit 460 from being separated from the base cover 422 even if an external force is applied to the movable unit 460 in the first direction or the second direction.

For example, even if an external force is applied to the movable unit 460 in the first direction or the second direction, since the external force in the first direction or the second direction is applied, as a coupling force used for coupling of the second coupling part to some of a plurality of first coupling parts, the movable unit 460 may be prevented from being separated from the base cover 422.

Meanwhile, the elastic member 426 is brought into contact with the back surface of the rotating body 461 in the state that the first coupling part 464 is coupled to the second coupling part 424. In this case, as long as the external force is not applied to the rotating body 461, the initial shape of the elastic member 426 is maintained, so the rotating body 461 is in the state of protruding from the inclined surface of the nozzle 40.

Figure 26:
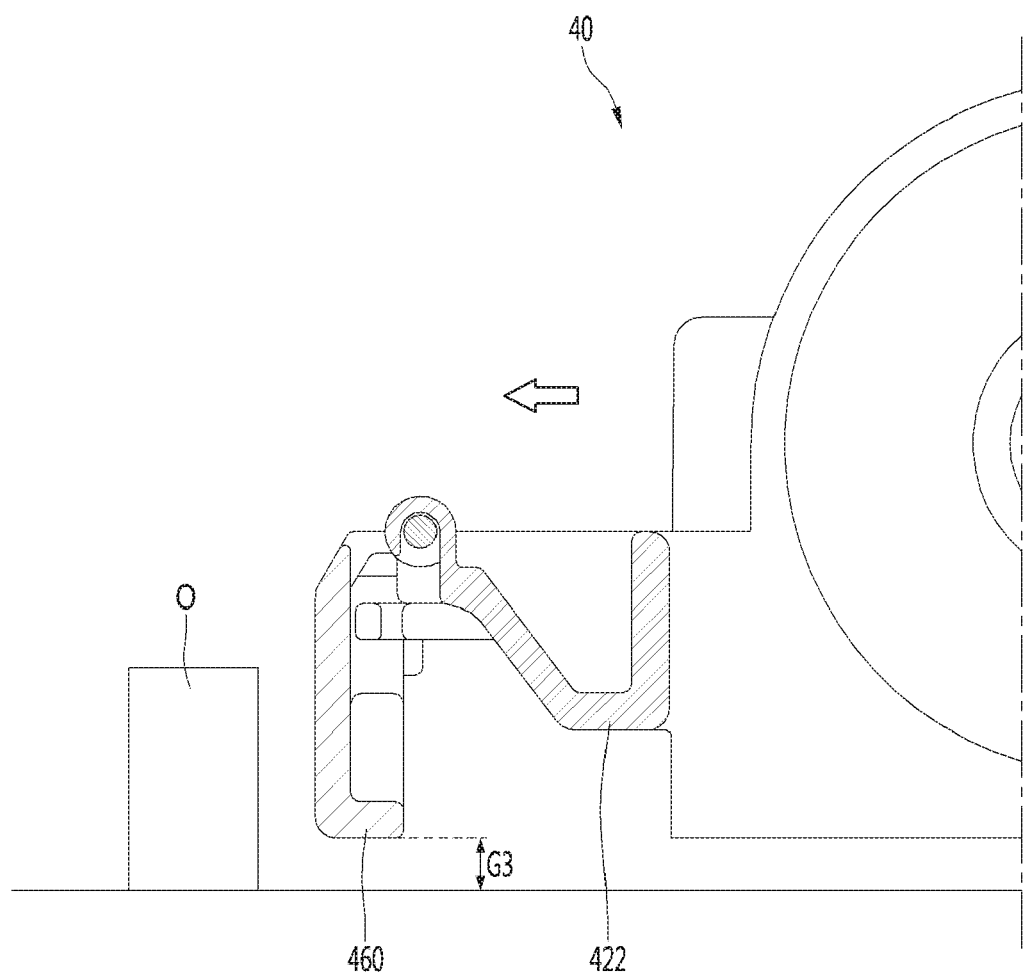
FIGS. 26 and 27 illustrate, step by step, that a moving unit is rotated in the process that the movable unit of the robot cleaner collides with an obstacle, according to a second embodiment of the present invention.
Figure 27:
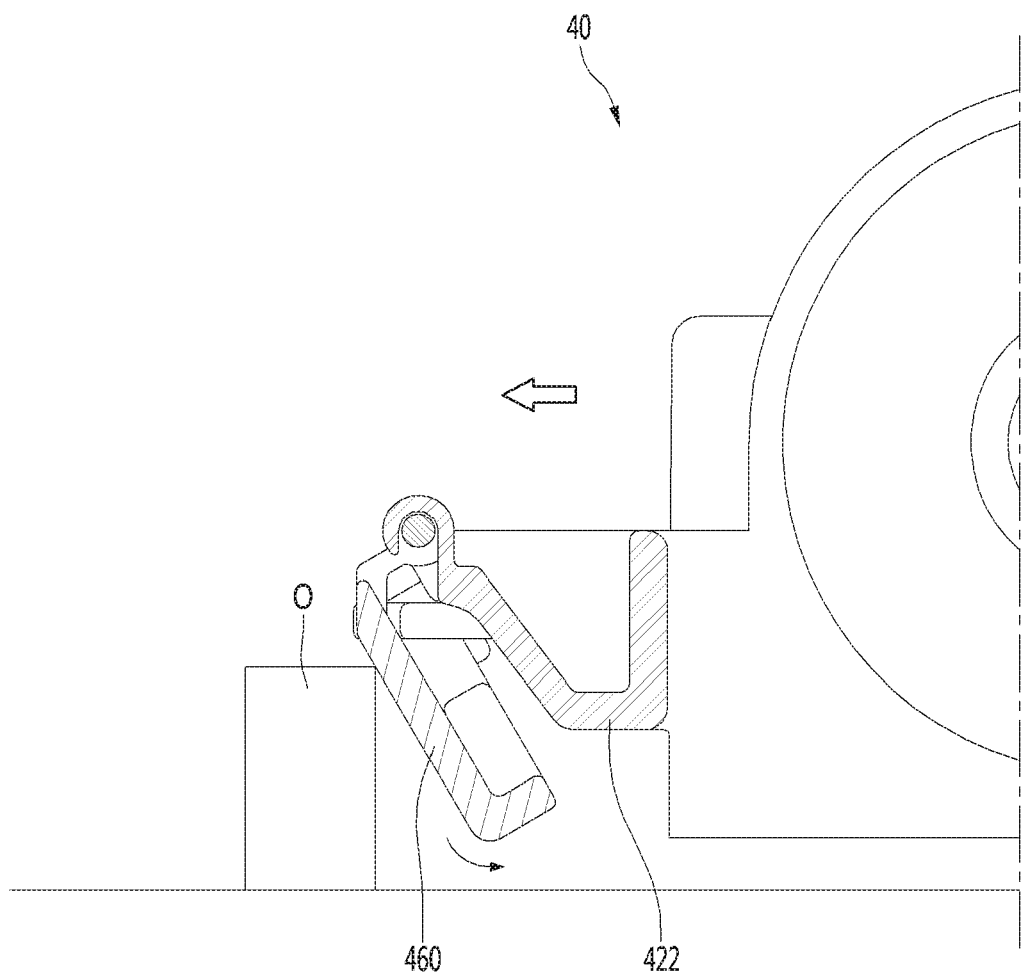

FIGS. 26 and 27 illustrate, step by step, that a moving unit is rotated in the process that the movable unit of the robot cleaner collides with an obstacle, according to a second embodiment of the present invention.

FIG. 26 illustrates the movable unit before the obstacle presses the movable unit, and FIG. 27 illustrates the state that the movable unit is rotated as the obstacle presses the movable unit.

First, referring to FIG. 26, if the external force is not applied to the movable unit 460, the movable unit 460 is supported by the elastic member 426, so that the movable unit 460 is in the state of protruding from the nozzle 40.

According to the present embodiment, the position of the movable unit 460 in the state of protruding to the front of the nozzle 40 to the maximum may be referred to as a second position of the movable unit 460.

In the state that the movable unit 460 is positioned at the second position, the lower end of the movable unit 460 may be spaced apart from the floor by G3.

When the movable unit 460 is positioned at the second position, a surface pressure between the movable unit 460 and the floor may be generated due to a gap G3 between the lower end of the movable unit 460 and the floor. The suction force of the suction motor acts to an area that the movable unit 460 is positioned, so that the corner cleaning performance may be improved.

Next, referring to 27, while the robot cleaner 1 performs cleaning in the state that the movable unit 460 is positioned at the second position, the obstacle O positioned lower than the shaft 465 of the movable unit 460 may collide with the movable unit 460.

According to the present embodiment, if the height of the obstacle O is higher than the height of the shaft 465 of the movable unit 460, the obstacle O may collide with the bumper instead of the movable unit 460.

Meanwhile, when the height of the obstacle O is lower than the height of the shaft 465 of the movable unit 460, the obstacle O may collide with the movable unit 460 and thus the movable unit 460 may be rotated.

When the obstacle O collides with the movable unit 460, the movable unit 460 may be rotated backward (counter-clockwise) in the drawing. While the movable unit 460 is rotated backward, the elastic member 426 may be elastically deformed and the movable unit 460 may overlap with the nozzle 40.

According to the present embodiment, the position of the movable unit 460 in the state that the movable unit 460 overlaps with the nozzle 40 may be referred to as a first position of the movable unit 460.

The front surface of the movable unit 460 may be inclined with respect to the vertical line in the state where the movable unit 460 overlaps with the nozzle 40.

When the front surface of the movable unit 460 may be inclined in the state where the movable unit 460 is positioned at the first position, the robot cleaner 1 may be moved in the state that the obstacle O is in contact with the inclined front surface of the movable unit 460.

Accordingly, the nozzle 40 of the robot cleaner 1 is lifted up by the obstacle O, so that the main wheel 11 of the robot cleaner 1 may easily cross over the obstacle O.

When the external force is removed from the movable unit 460 after the robot cleaner 1 crosses over the obstacle O, the movable unit 460 returns to the second position by the elastic force of the elastic member 426.

Although the present embodiment has been described in that the movable unit 460 is rotatably connected to the base cover 422, the movable unit 460 is directly rotatably connected to the base unit 422 by changing the shape of the base cover 422 and the base 420. In this case, the movable unit 460 may be rotated from the second position to the first position by the contact with the obstacle.

According to the suggested present invention, since the movable unit may protrude forward from the inclined surface of the nozzle, the corner may be cleaned by the surface pressure between the movable unit and the floor.

According to the present invention, since the movable unit may overlap with the inclined surface of the nozzle, interference between the obstacle and the movable unit may be prevented, so the robot cleaner may cross over an obstacle.

Further, according to the present invention, the movable unit may be rotated by directly or indirectly receiving impact force caused by collision with an obstacle without the handling of the user or additional power between the first position that the movable unit overlaps with the nozzle and the second position that the movable unit protrudes from the nozzle. Accordingly, the structure of the movable unit may be simplified.

What is claimed is:

1. A robot cleaner comprising:
a main body configured to contain a suction motor;
a nozzle coupled to the main body, the nozzle including a suction port;
a bumper movably mounted in the nozzle and configured to absorb an impact upon collision of the nozzle with an obstacle; and
a movable unit coupled to the nozzle in front of the suction port and connected with the bumper, the movable unit being configured to rotate between a first position overlapping with the nozzle and a second position protruding forward from the nozzle upon receiving a moving force from the bumper while an external force is applied to the bumper,
wherein a lower end of the movable unit is located in front of the suction port in the first position and in the second position,
wherein a distance between a floor and the lower end of the movable unit in the second position is less than a distance between the floor and the lower end of the movable unit in the first position,
wherein the movable unit comprises:
a rotating body;
a connecting part extending upward from the rotating body;
a hinge part configured to allow rotation of the rotating body and including a shaft extending in a horizontal direction, and
wherein the main body includes:
a hole through which the connecting part and the hinge part pass, and
a seating groove configured to seat the shaft.

2. The robot cleaner of claim 1, wherein a front surface of the movable unit is inclined relative to a vertical line when the movable unit is in the first position.

3. The robot cleaner of claim 1, wherein a front surface of the movable unit is positioned behind a front surface of the bumper when the movable unit is in the second position.

4. The robot cleaner of claim 1, wherein the movable unit is positioned at the first position when an external force is not applied to the bumper, and
wherein the movable unit is configured to receive the moving force from the bumper and move from the first position to the second position when the external force is applied to the bumper.

5. The robot cleaner of claim 4, wherein the nozzle further includes a base, the suction port being formed in the base, the bumper being seated on the base, and
the movable unit being coupled to a lower portion of the base and connected with the bumper.

6. The robot cleaner of claim 5, wherein the movable unit includes a contact protrusion extending upward from the connecting part, and
wherein the bumper includes a transmission part connected with the contact protrusion.

7. The robot cleaner of claim 6, wherein the transmission part includes:
a first part positioned in front of the contact protrusion, and a second part positioned behind at least a portion of the contact protrusion.

8. A robot cleaner comprising:
a body configured to house a suction motor;
a nozzle connected with the body, the nozzle including a suction port; and
a movable unit coupled to the nozzle,
wherein the movable unit is in a second position protruding to a front portion of the nozzle when an external force is not applied to the movable unit, and
the movable unit is configured to move from the second position to a first position where the movable unit overlaps with the nozzle when the external force is applied to the movable unit,
wherein the movable unit includes: a rotating body with a shaft extended in a horizontal direction,
a plurality of extension parts extended downward from the rotating body and spaced apart from each other in a lengthwise direction of the rotating body, and
wherein each of the plurality of extension parts defines a portion of an opening recessed upward from a lower end of each of the plurality of extension parts,
wherein the robot cleaner further comprises an elastic member configured to elastically support the movable unit such that the movable unit is moved from the first position to the second position by the elastic member when the external force is not applied to the movable unit, and
wherein the elastic member protrudes from the base cover, includes multiple bends, and contacts a back surface of the rotating body.

9. The robot cleaner of claim 8, wherein the nozzle includes:
a base; and
a base cover coupled to the base, the base cover including the suction port, and
wherein the movable unit is rotatably coupled to the base cover.

10. The robot cleaner of claim 9, wherein the rotating body includes:
a first coupling part extending from the rotating body and coupled to the base cover, and
the base cover includes a second coupling part coupled to the first coupling part.

11. The robot cleaner of claim 10, wherein:
the first coupling part includes the shaft,
the second coupling part includes a shaft coupling part configured to receive the shaft of the first coupling part, and
the shaft coupling part includes a slit configured to receive the shaft.

* * * * *